Aug. 8, 1944.  E. J. KEARNEY ET AL  2,355,082
MACHINE TOOL
Filed June 9, 1938    11 Sheets-Sheet 5
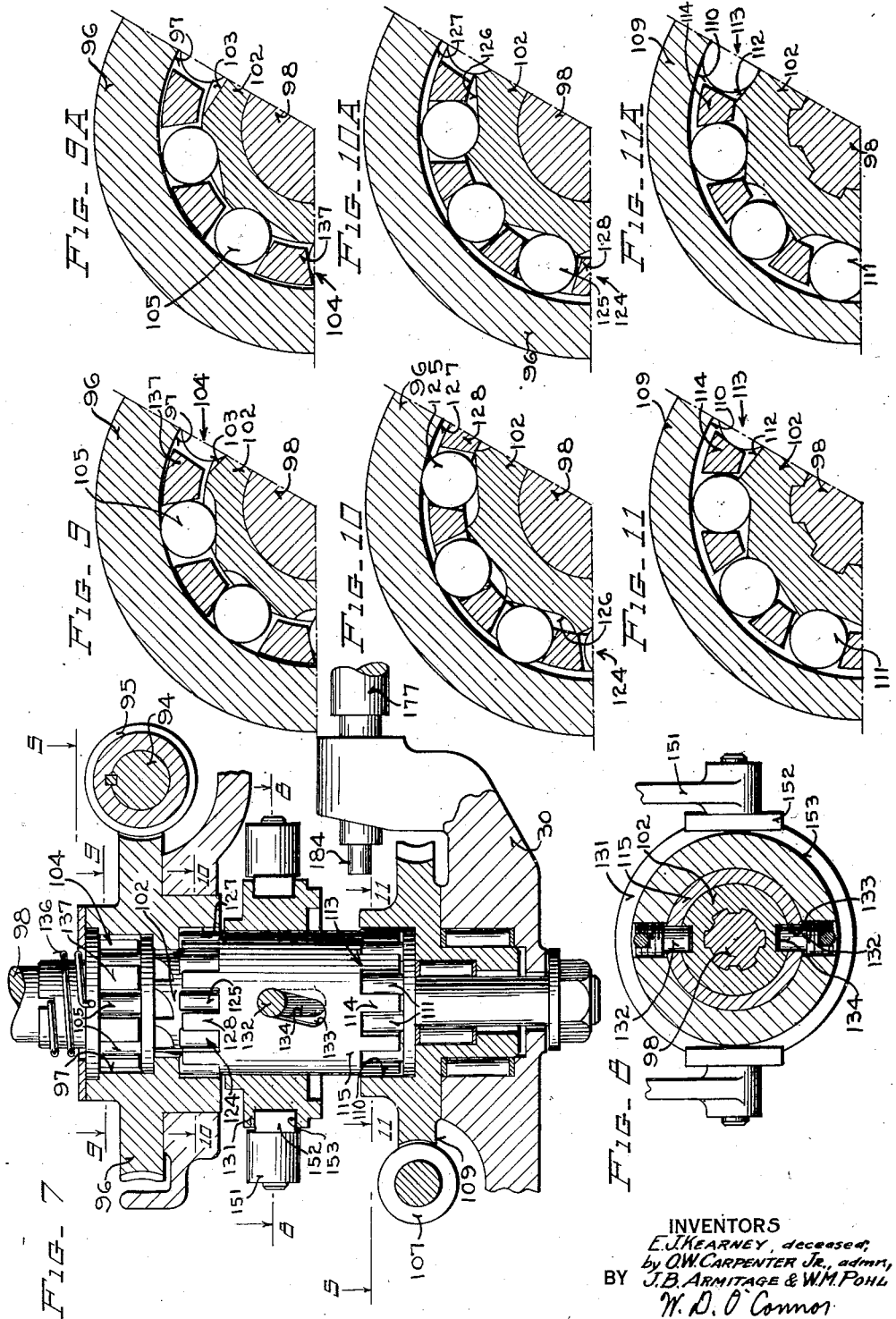
INVENTORS
E. J. KEARNEY, deceased,
by O.W. CARPENTER Jr., admr.,
BY J.B. ARMITAGE & W.M. POHL
W. D. O'Connor
ATTORNEY Aug. 8, 1944.　　　　E. J. KEARNEY ET AL　　　　2,355,082
MACHINE TOOL
Filed June 9, 1938　　　11 Sheets-Sheet 6

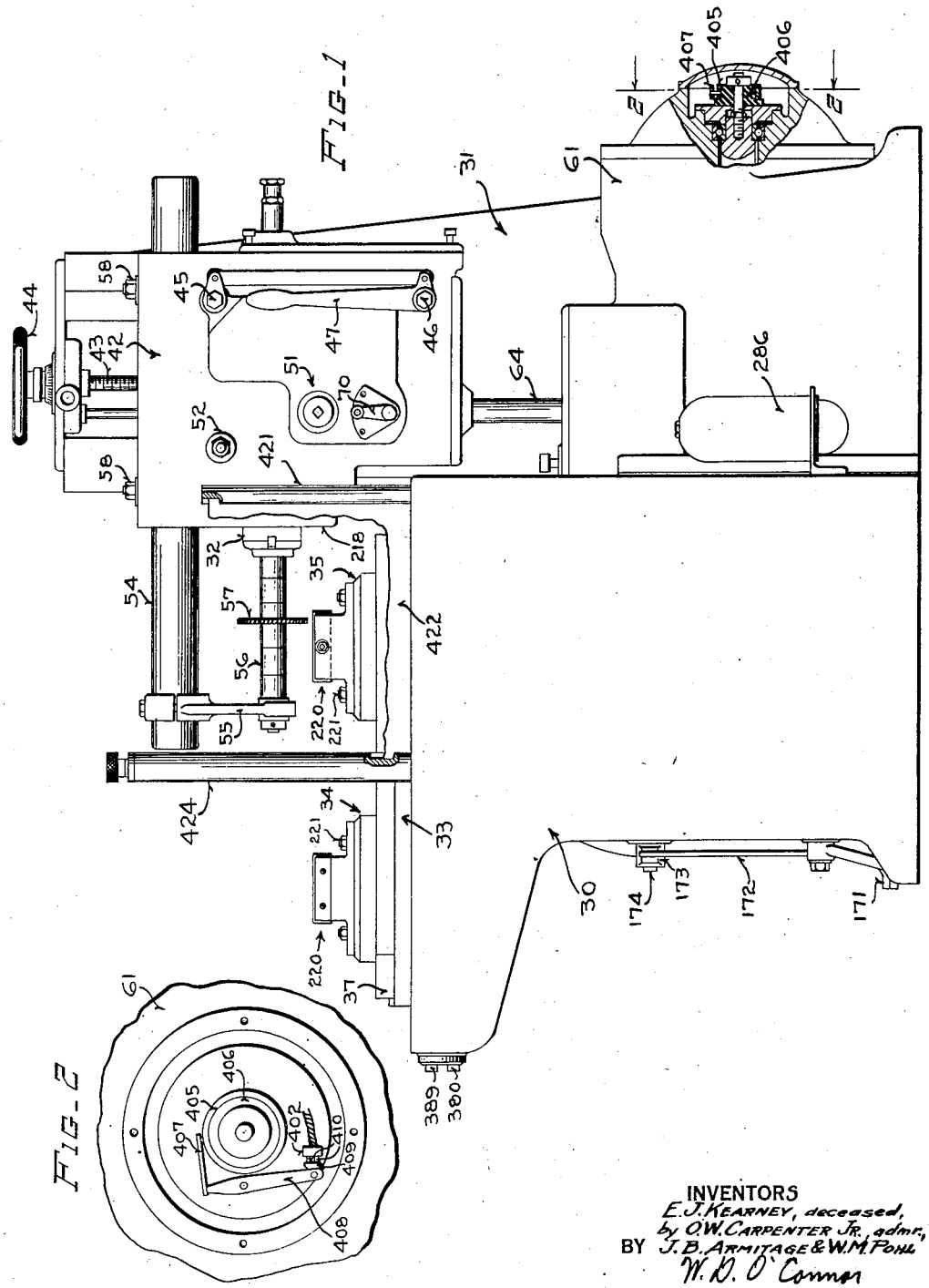

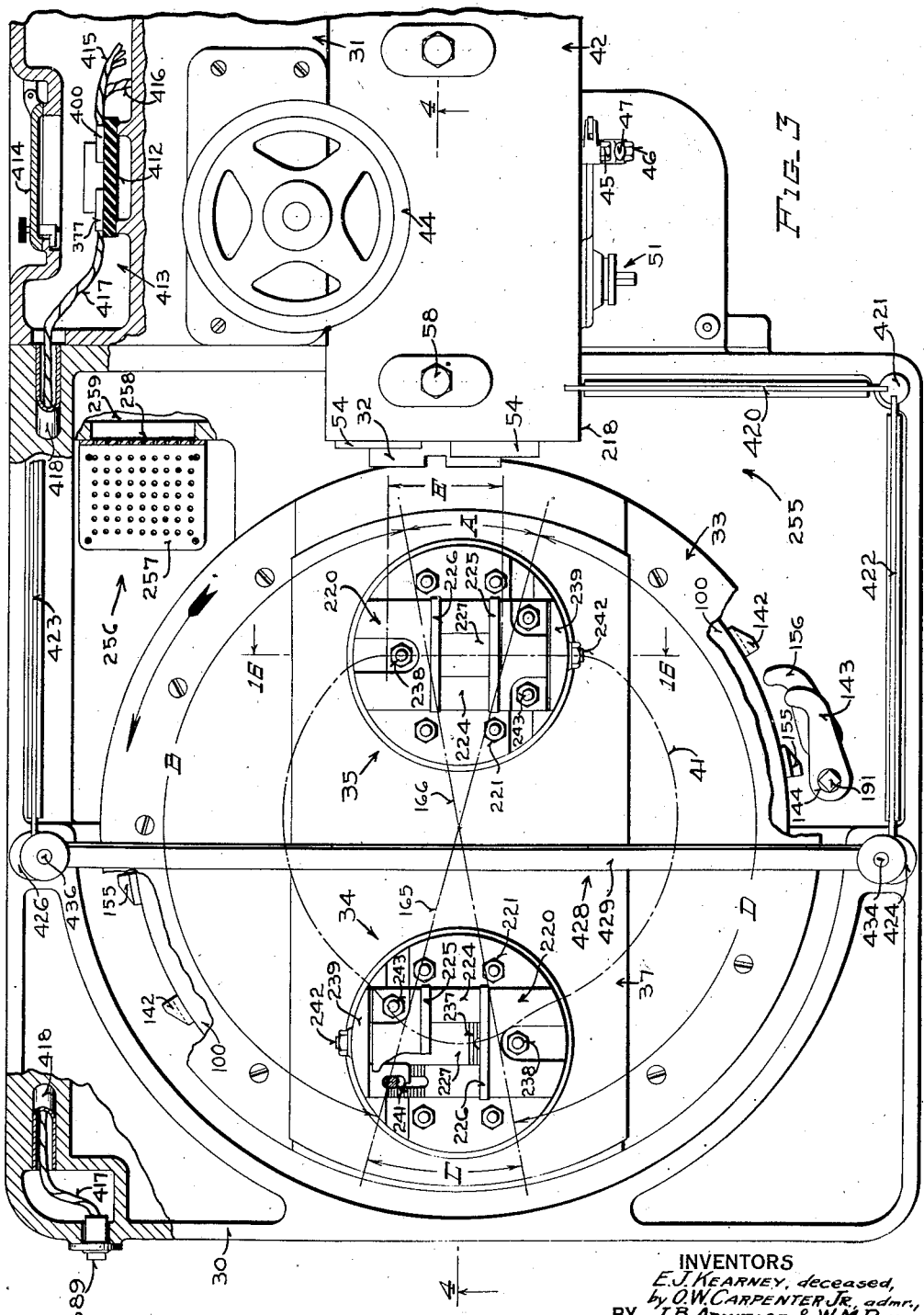
FIG_3

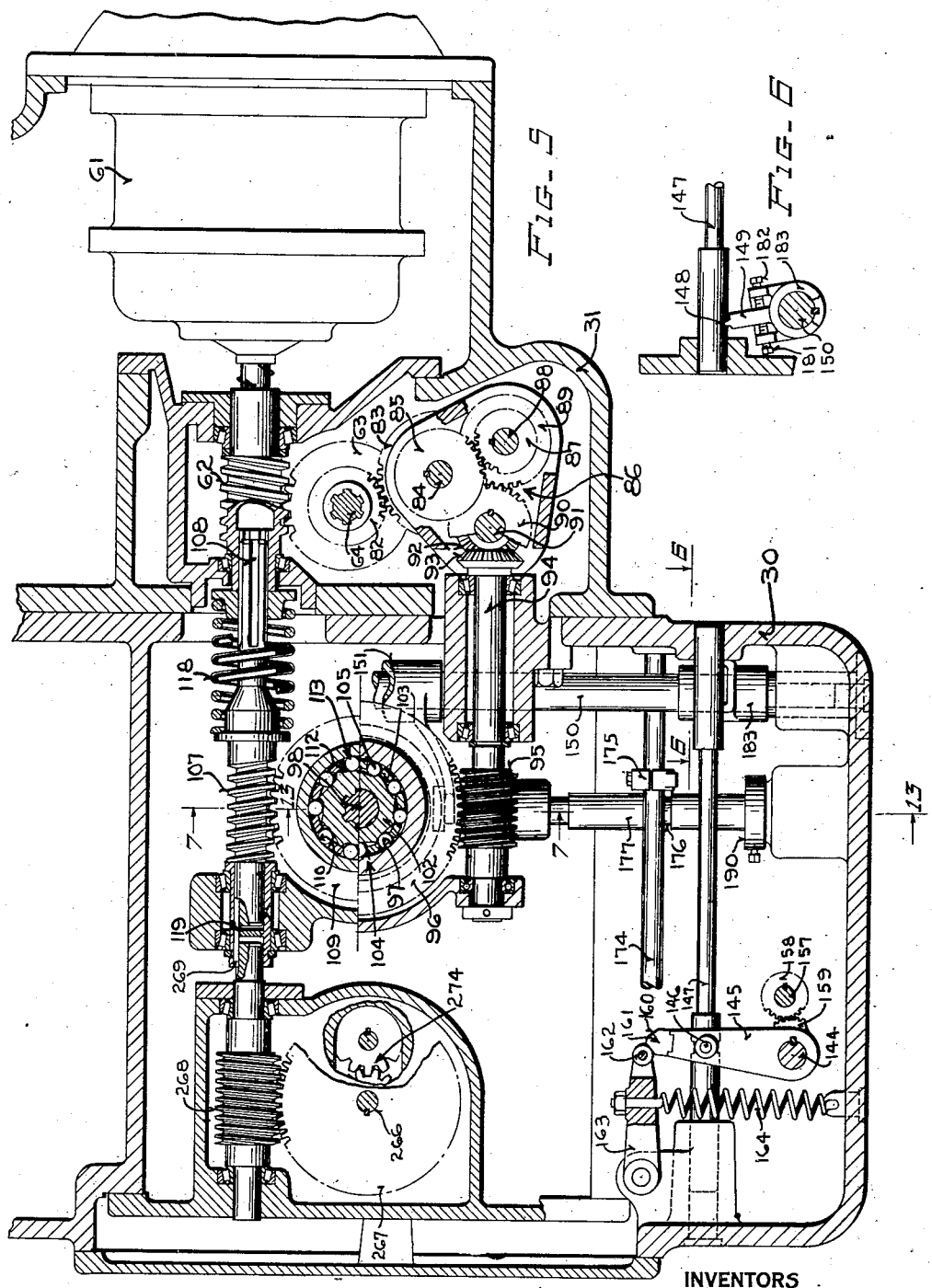

INVENTORS
E.J. KEARNEY, deceased,
by O.W.CARPENTER Jr. admr.,
BY J.B.ARMITAGE & W.M.POHL
W.D.O'Connor
ATTORNEY Aug. 8, 1944.    E. J. KEARNEY ET AL    2,355,082
MACHINE TOOL
Filed June 9, 1938    11 Sheets-Sheet 7

INVENTORS
E. J. KEARNEY, deceased,
by O. W. CARPENTER Jr., admr.,
BY J. B. ARMITAGE & W. M. POHL
W. D. O'Connor
ATTORNEY Aug. 8, 1944.   E. J. KEARNEY ET AL   2,355,082
MACHINE TOOL
Filed June 9, 1938   11 Sheets-Sheet 8
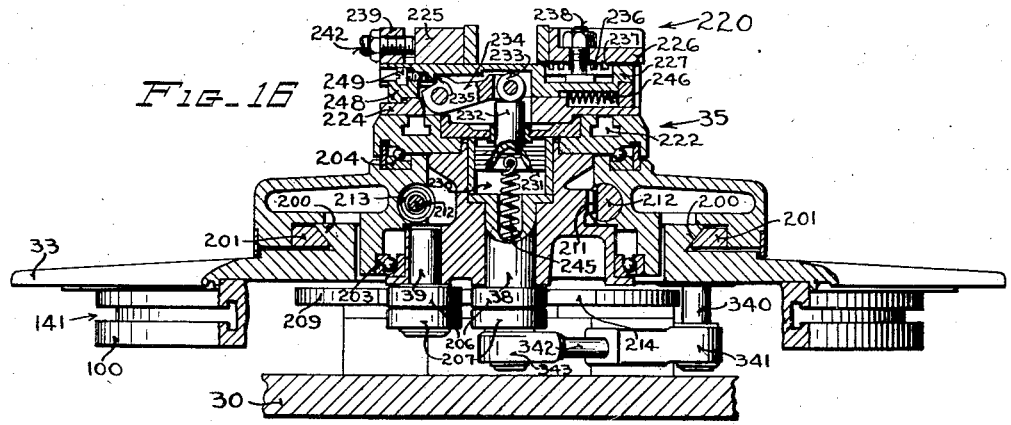
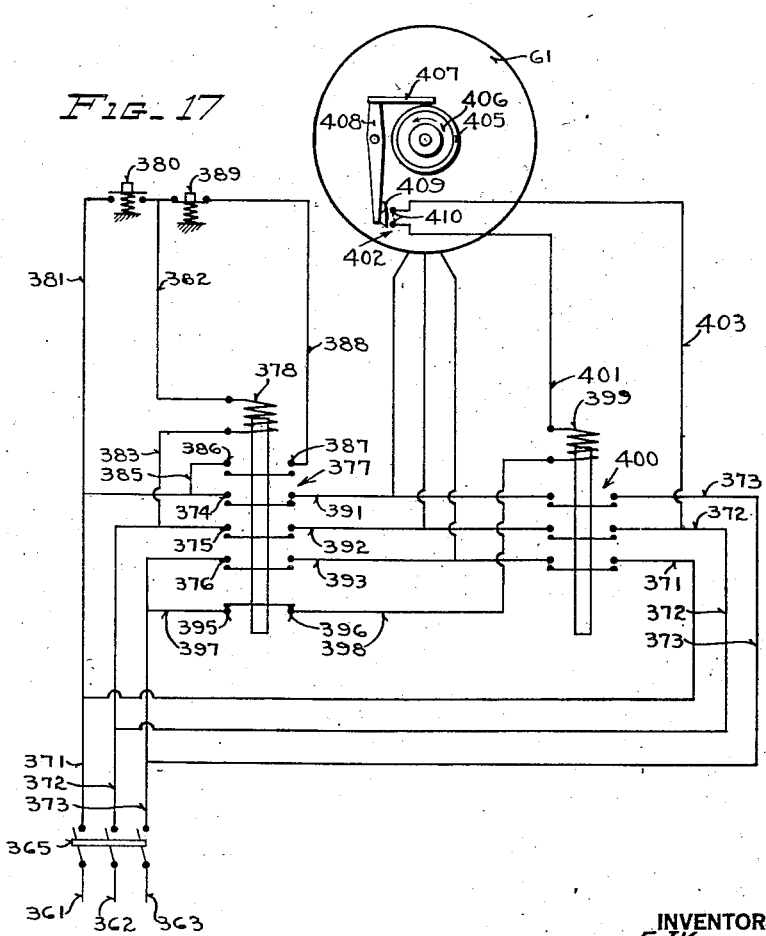
INVENTORS
E.J.KEARNEY, deceased,
by O.W.CARPENTER Jr., admr.,
BY J.B.ARMITAGE & W.M.POHL
W.D.O'Connor
ATTORNEY Aug. 8, 1944.                E. J. KEARNEY ET AL                2,355,082
                                MACHINE TOOL
                       Filed June 9, 1938        11 Sheets-Sheet 9
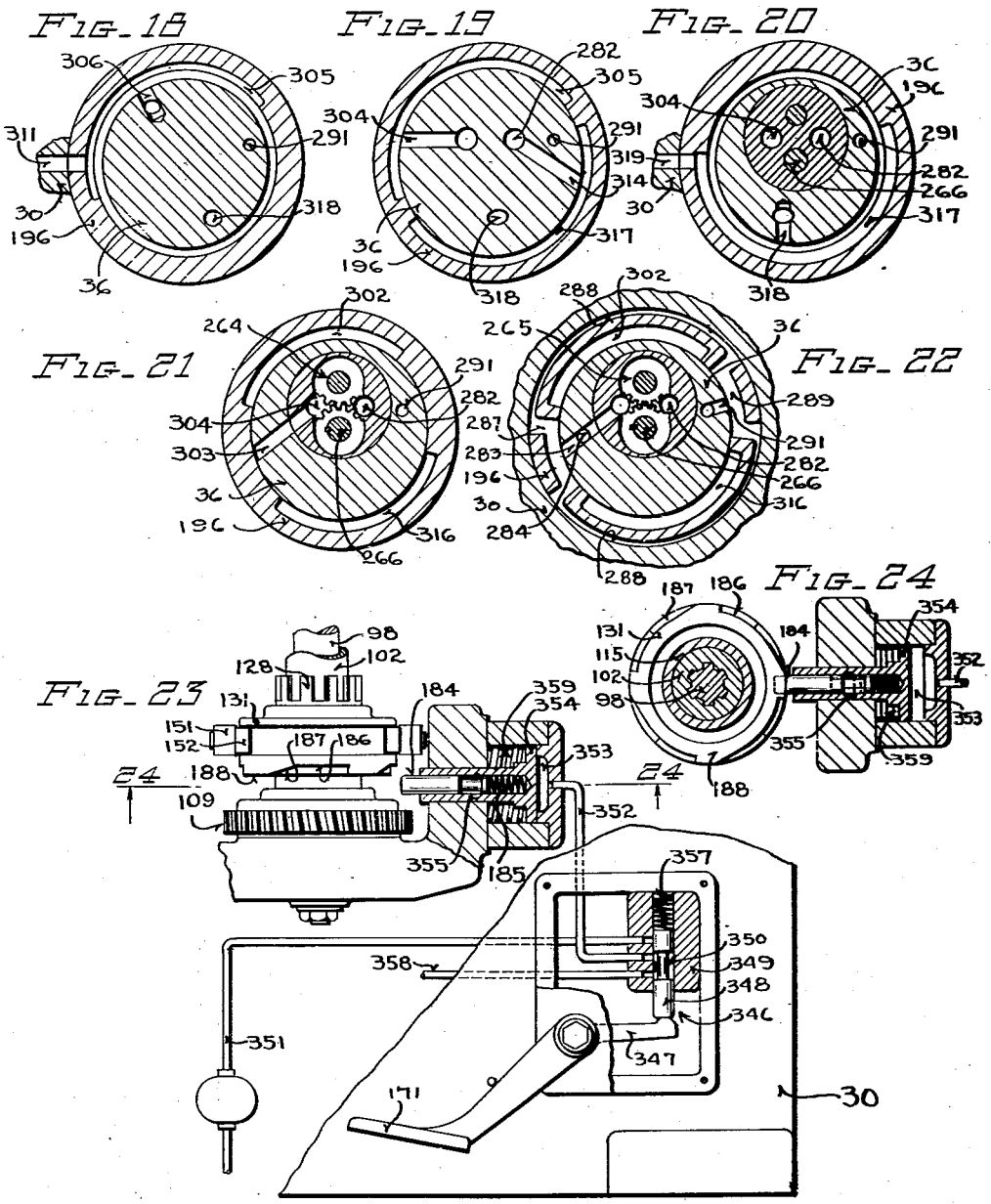

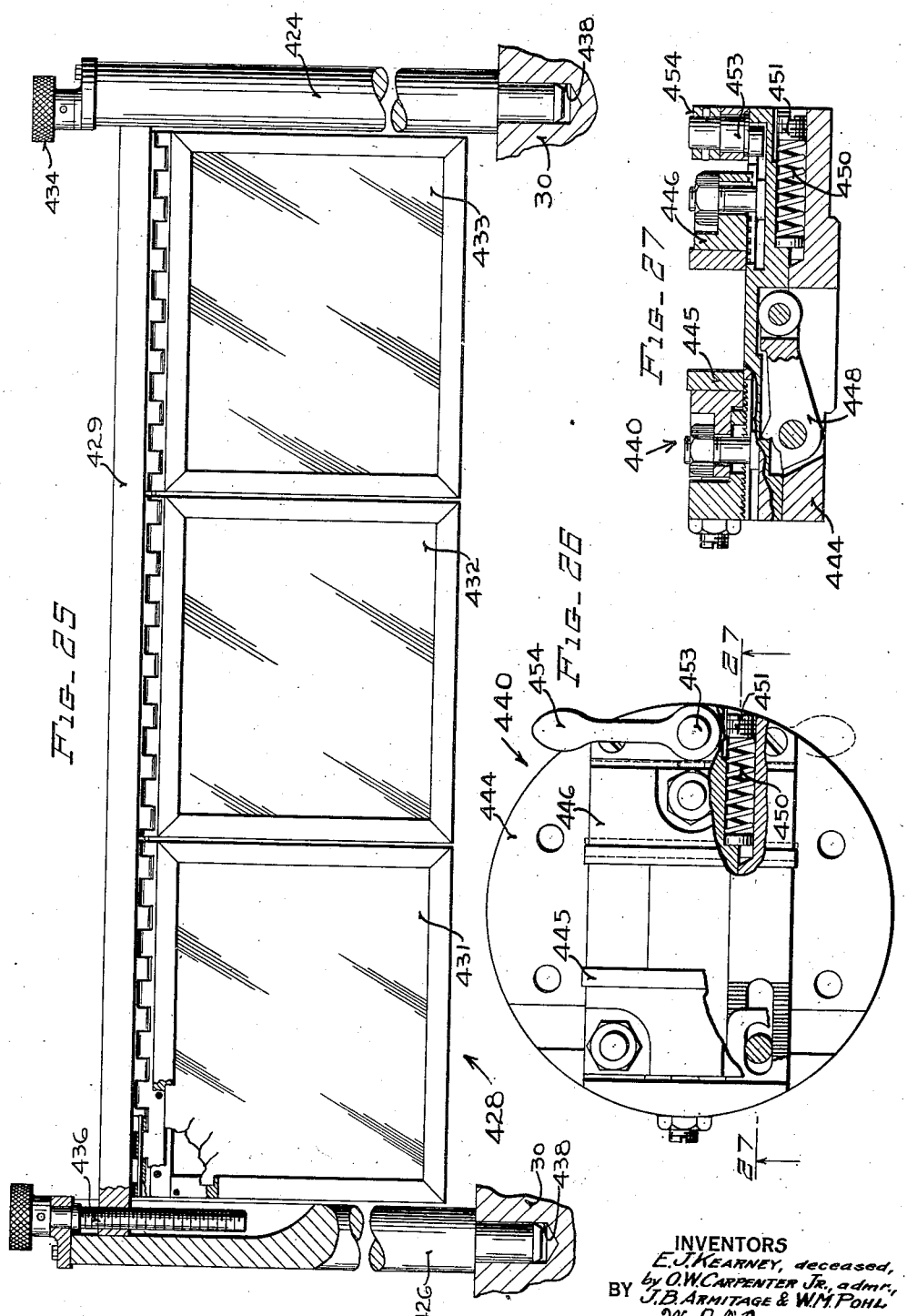

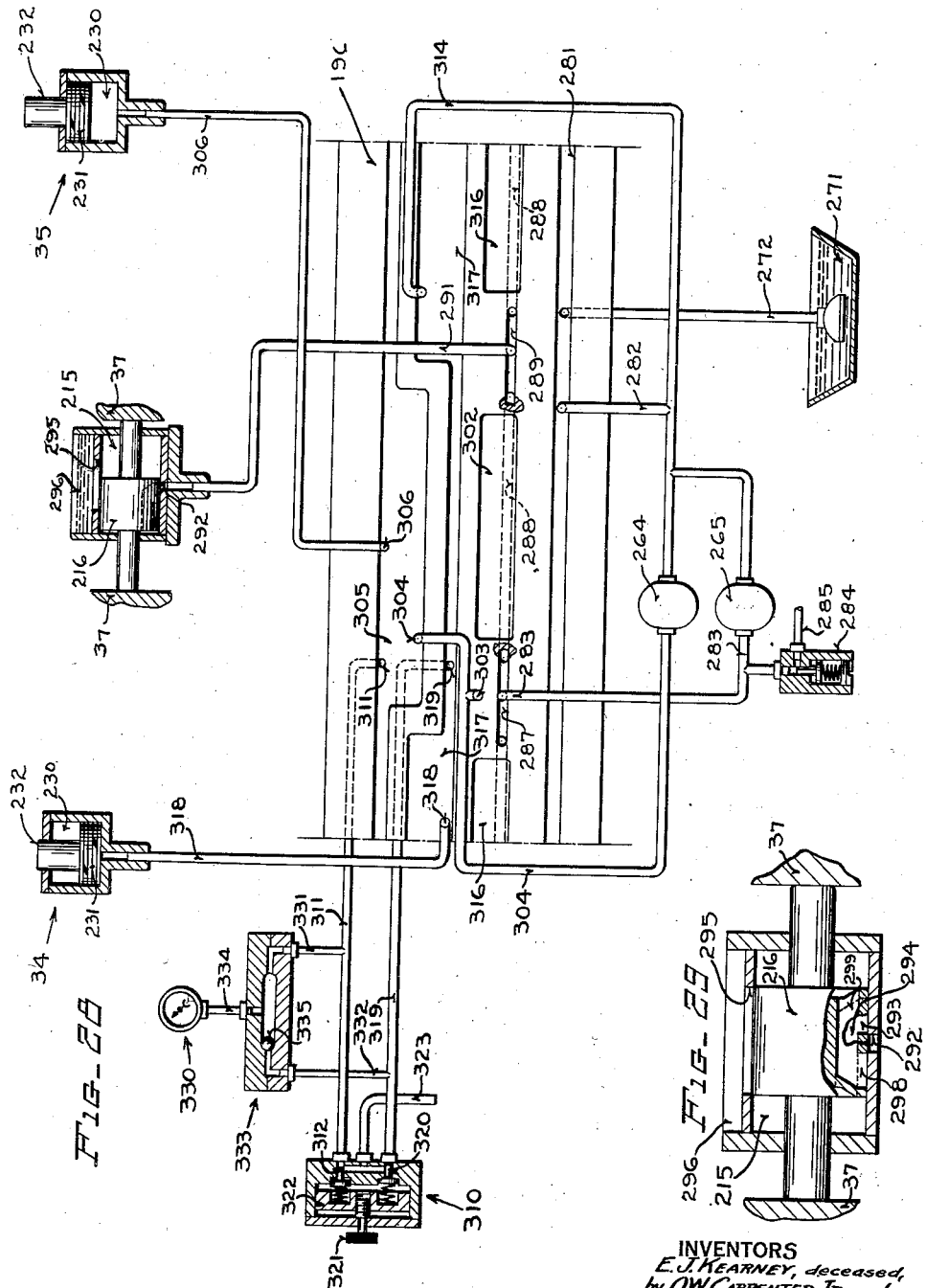

Patented Aug. 8, 1944

2,355,082

UNITED STATES PATENT OFFICE 2,355,082

MACHINE TOOL

Edward J. Kearney, deceased, late of Wauwatosa, Wis., by Otto W. Carpenter, Jr., special administrator, Fox Point, Wis.; Joseph B. Armitage, Wauwatosa, Wis., and Walter M. Pohl, Washington, D. C., assignors to Kearney & Trecker Corporation, West Allis, Wis., a corporation of Wisconsin Application June 9, 1938, Serial No. 212,704

23 Claims. (Cl. 90—20)

This invention relates generally to machine tools, and more particularly to an automatically operating milling machine.

In order to operate a milling machine at maximum production efficiency, successive workpieces must be fed to the milling cutter in such a manner that the delay occurring between the completion of one workpiece and the beginning of the cutting operation on the next workpiece is reduced to the minimum. According to a generally practiced method of operating a standard milling machine, a workpiece is moved at rapid traverse rate from a loading position in direction to approach the cutting zone; then it is fed past the milling cutter in the cutting stroke; then it is withdrawn by moving it past the cutter a second time in the opposite direction at rapid traverse rate to return it to the loading position. To avoid having the finished workpiece gouged by the cutter in returning past it to the loading position, it is the usual practice to stop the cutter spindle at the end of the feed stroke, the cutter remaining stationary until the beginning of the succeeding feed stroke. This method of operation is time consuming and is otherwise unsatisfactory, the work being scratched by the cutter in some instances in moving past it on the return stroke. Because of these shortcomings, it has been generally recognized that milling machines should be so constructed as to provide for leading the finished workpiece away from the cutting zone without withdrawing it past the cutter.

It is therefore a general purpose of the present invention to provide an improved automatically operating milling machine capable of maximum production in machining workpieces.

Another purpose of the invention is to provide a milling machine capable of effecting an automatic cycle of operations so correlated that the cutting action upon successive workpieces is performed in a substantially continuous manner.

Another object of the invention is to provide a milling machine so arranged that a finished workpiece may be led away from the cutting zone without withdrawing it across the cutter.

Another object is to provide an improved milling machine adapted to move successive workpieces past a rotating milling cutter continuously in the same direction.

Another object is to provide a milling machine in which the work holding elements are returned to the loading station after the cutting stroke is completed without moving through the cutting zone in reverse direction.

Another object is to provide a milling machine having mechanism for moving a plurality of work holding elements successively through a fixed loading and unloading zone.

Another object is to provide a milling machine in which both the rotating cutter spindle and the movable work supporting table operate continuously in effecting successive milling operations.

Another object is to provide a machine tool having work-holding elements arranged to be guided along a predetermined path by means of a cam track.

Another object is to provide a machine tool having a rotary work carrying table and having work holding fixtures movably mounted on the table, together with means for guiding the fixtures along a predetermined path as the table is rotated.

Another object is to provide a machine tool having a cam guided movable member and fluid pressure means arranged to retain said member in predetermined relationship with its guiding cam.

Another object is to provide a milling machine in which a workpiece may be loaded at a safe distance from the cutter, then quickly advanced to a position closely adjacent to the cutter, and then immediately fed through the cutting zone.

Another object is to provide an improved transmission and control mechanism for a machine tool.

Another object is to provide an improved electrical control system for a machine tool.

Another object is to provide a machine tool of the rotary table type with means for effecting straight line cutting of workpieces without the necessity of indexing the table or moving it bodily along a straight line.

Another object is to provide improved means for automatically changing the rate of movement of a work supporting member from rapid traverse to feed rate precisely at a predetermined position.

Another object is to provide a rotary table having positively acting clutching means arranged to be actuated automatically for changing the rate of movement of the table accurately at a predetermined position.

Another object is to provide a machine tool having a work support adapted to move alternately at feed rate and at rapid traverse rate and having control means whereby the operator may prolong the movement at feed rate to extend the time available for loading a work holding fixture.

Another object is to provide a control mechanism for a machine tool whereby movement of the various machine elements may be arrested substantially instantaneously with a minimum amount of coasting.

Another object is to provide improved control means for a machine tool whereby the machine may be stopped quickly by reversing the driving motor.

According to this invention, an automatic milling machine is arranged to receive workpieces at a loading station some distance from the milling cutter and to advance the workpieces into engagement with the cutter successively in manner to effect a substantially continuous machining operation, the finished workpieces being led away from the cutting zone back to the loading position without moving across the cutter a second time. For supporting and moving the workpieces, there is provided a continuously rotating table carrying a plurality of movably mounted work holders which cooperate with a cam track in manner to move successive workpieces through the cutting zone along a straight line path. The work holders include clamping means actuated by fluid pressure and controlled in accordance with the angular position of the table. The continuously rotating table is actuated alternately at rapid traverse rate and at feed rate, the rapid traverse movement functioning to quickly advance a workpiece to the cutting zone and to rapidly lead a finished workpiece away from the cutting zone, the table turning mechanism being controlled automatically by trip mechanism acting upon means for effecting change from rapid traverse rate to feed rate at an accurately predetermined position, thereby permitting the workpiece to approach closely to the cutter at rapid traverse rate. A fresh workpiece is loaded in a work holder while the table is turning slowly in feeding a previously loaded piece past the cutter, selective control means being arranged to permit the machine operator to delay engagement of the rapid traverse drive in order to prolong the loading period if necessary. A resilient connection is provided for preventing shock when the rapid traverse drive is engaged, and means are provided for adjusting the work clamps to adapt them to the workpiece. An electrical control system for the driving motor functions to stop the machine instantaneously by reversing the motor before disconnecting it, the control apparatus being housed within a compartment formed in the frame of the machine.

The foregoing and other objects of this invention which will become more fully apparent from the following detailed specification, may be achieved by means of the particular milling machine constituting an exemplifying embodiment of the invention that is depicted in and described in connection with the accompanying drawings, in which:

Figure 1 is a view in right side elevation of an automatic milling machine embodying the features of this invention;

Fig. 2 is a detailed view of control mechanism for the driving motor of the machine, taken with the switch cover removed and looking in the direction indicated by the arrows 2—2 in Fig. 1;

Fig. 3 is a partial top plan view of the machine shown in Fig. 1, with parts broken away to show the internal mechanism;

Fig. 5 is a view in horizontal section of part of the driving mechanism, taken generally along the planes represented by the lines 5—5 in Figs. 4 and 7;

Fig. 6 is a detailed view partly in section of an element of the driving mechanism taken along the plane represented by the line 6—6 in Fig. 5;

Fig. 7 is a view largely in vertical section, of part of the driving mechanism taken approximately along the plane represented by the line 7—7 in Fig. 5 and showing the table controlling clutches;

Fig. 8 is a detailed view in horizontal cross-section of the clutch shifting mechanism taken along the line 8—8 in Fig. 7;

Figure 4:
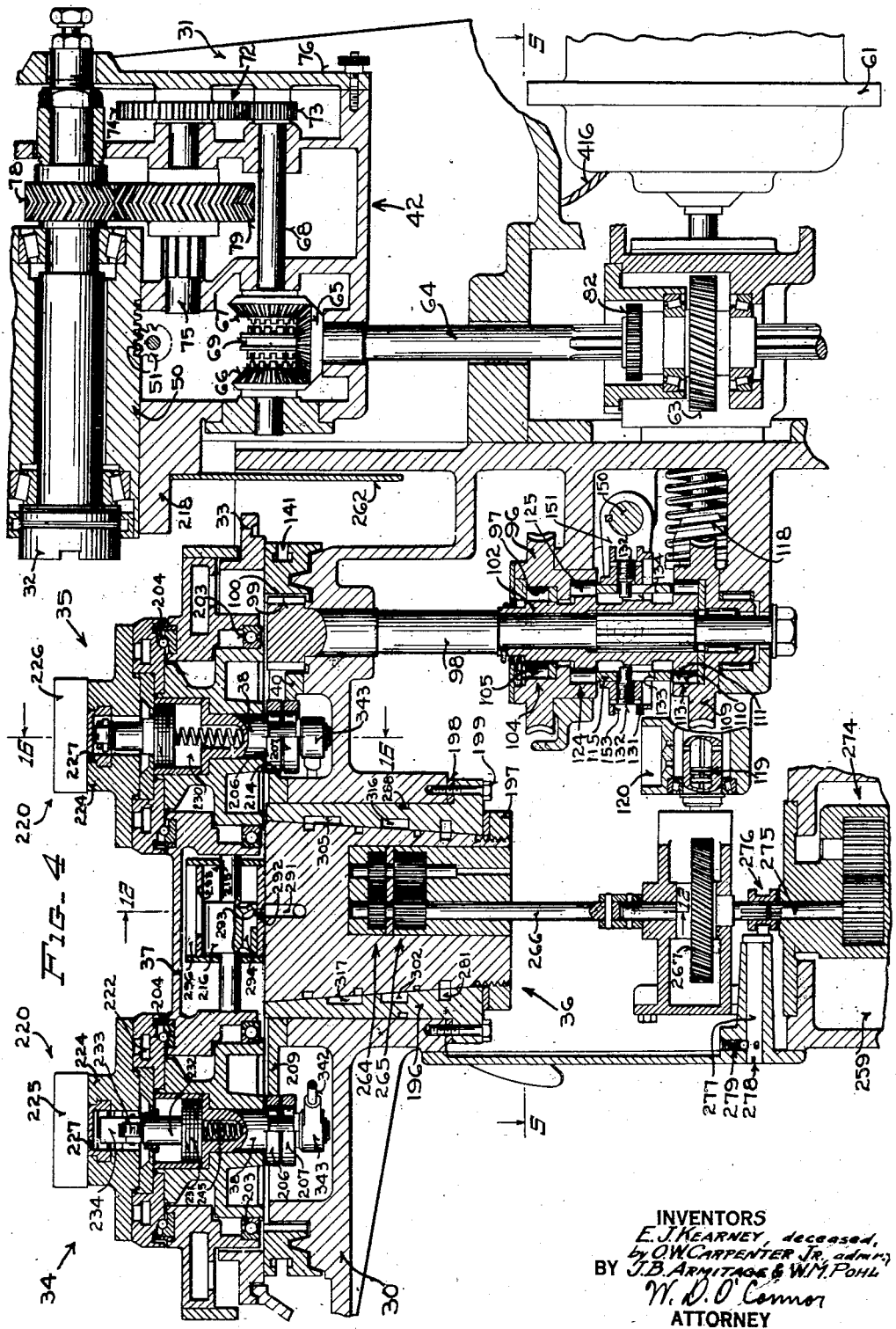
Fig. 4 is a view in vertical longitudinal section through the machine, taken approximately along the plane represented by the line 4—4 in Fig. 3 and showing the driving mechanism.
Figure 12:
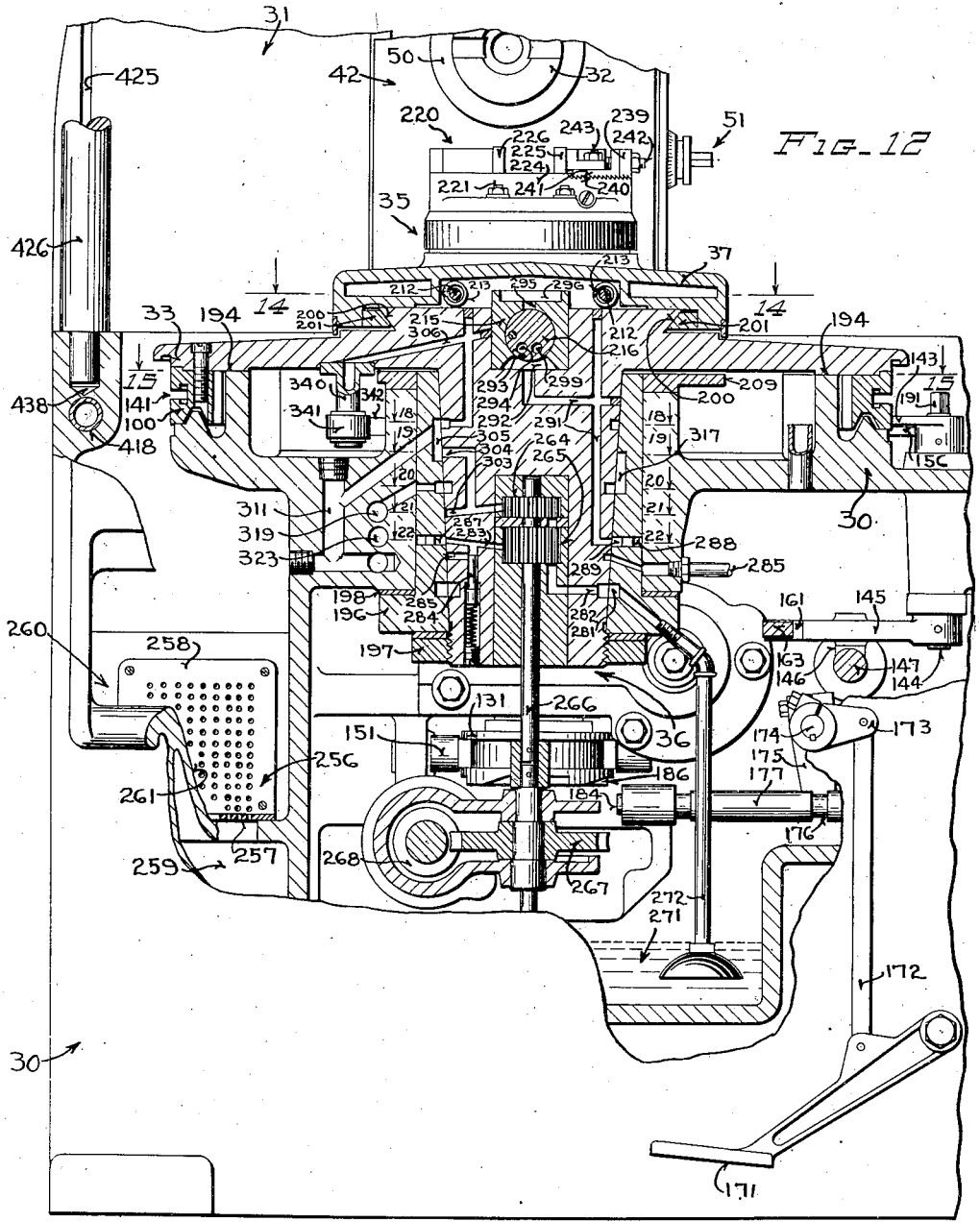
Figure 13:
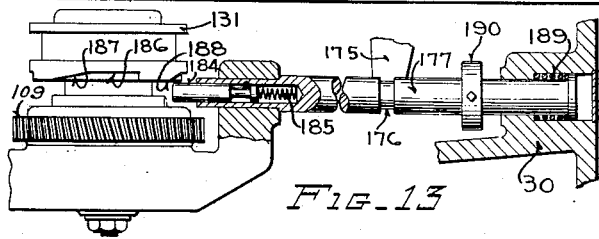
Figure 14:
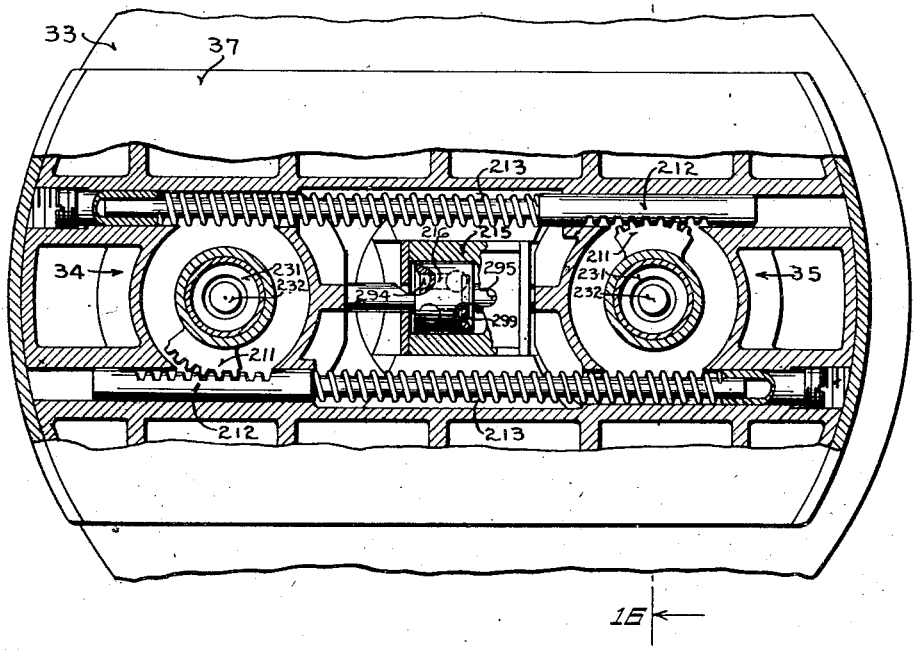
Figure 15:
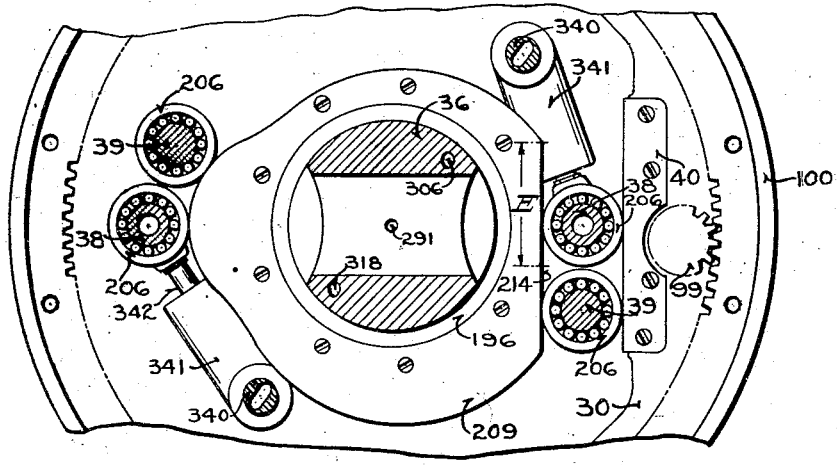

Figs. 9, 10, and 11 are fragmentary detailed views in cross-section taken along the lines 9—9, 10—10, and 11—11 respectively in Fig. 7, and showing elements of the various control clutches;

Figs. 9A, 10A, and 11A are views similar to Figs. 9, 10, and 11 respectively, but showing the clutches shifted to another position;

Fig. 12 is a view largely in vertical transverse section through the machine, taken generally along the plane represented by the line 12—12 in Fig. 4;

Fig. 13 is a detailed fragmentary view in vertical section of selective mechanical control mechanism, taken approximately along the plane represented by the line 13—13 in Fig. 5;

Fig. 14 is a fragmentary view of the rotary table mechanism taken in horizontal cross-section along the line 14—14 in Fig. 12;

Fig. 15 is another view in horizontal cross-section of the table mechanism, taken approximately along the plane represented by the line 15—15 in Fig. 12 and showing the work guiding cams;

Fig. 16 is a view in vertical section through one of the work holding vises, taken along the plane represented by the lines 16—16 in Figs. 3, 4 and 14;

Fig. 17 is a schematic wiring diagram of the electrical control system for the driving motor of the machine;

Figs. 18, 19, 20, 21, and 22 are views in horizontal section through the hydraulic pumps and control valve in the table gudgeon, taken respectively along the correspondingly numbered lines in Fig. 12;

Fig. 23 is a partly diagrammatic illustration of selective hydraulic clutch controlling mechanism constituting a modification of the mechanical clutch controlling mechanism illustrated in Fig. 13;

Fig. 24 is a view of the modified clutch controlling mechanism in horizontal section, taken along the plane represented by the line 24—24 in Fig. 23;

Fig. 25 is a detail view in front elevation of the chip guard shown on the machine in Figs. 1 and 3, parts being broken away to better reveal the internal construction;

Fig. 26 is a plan view of a work holding vise constituting a modification of the vise shown mounted on the machine table;

Fig. 27 is a view of the modified vise taken in vertical section along the plane represented by the line 27—27 in Fig. 26;

Fig. 28 is a schematic diagram of the automatic hydraulic control circuit for the milling machine; and Fig. 29 is an enlarged view of the stabilizing cylinder and piston mechanism shown at the top in Fig. 28, the piston having been moved to its central position.

Referring more specifically to the drawings, Figs. 1 and 3 thereof in particular show the general structure of the continuously operating automatic milling machine constructed in accordance with the principles of this invention that is particularly referred to herein by way of example. As there shown, the machine comprises essentially a bed or base 30, having secured at its back an upstanding spindle supporting column 31 which carries an adjustably mounted tool spindle 32. Rotatably mounted on the top of the bed 30 in front of the column 31 is a horizontally disposed circular work supporting table 33 carrying a pair of work holding fixtures 34 and 35 disposed thereon in diametrically opposed relationship. As shown in Figs. 4 and 12, the rotatable table 33 is provided with a depending central gudgeon 36 that is journaled in the top of the bed 30 in manner to constitute a pivotal mounting for the table.

The two work holding fixtures 34 and 35 are supported on the table 33 in manner to be movable radially thereof, by means of a reciprocating cross slide 37 that is slidably mounted diametrically of the table 33 as shown in Fig. 3, the fixtures being rotatably mounted near the respective ends of the slide. By this arrangement the work holding fixtures are movably mounted on the table 33 in such manner that when the table is rotated, the fixtures in turning with it may be guided successively through the cutting zone along a predetermined path. For effecting this guiding action, each fixture is provided with two depending studs or arms 38 and 39 which carry rollers at their lower ends disposed to engage with and roll upon the straight surface of a guiding cam 40 mounted in the bed 30 as shown in Fig. 15. The cam and rollers cooperate in a manner to cause the work holder to follow a straight line path through the cutting zone as the table is rotated, the fixtures each having a compound motion by reason of the sliding and turning movements provided by its rotatable mounting on the reciprocating cross slide 37. This provides for feeding workpieces successively in the same direction along the straight line path through the cutting zone and then leading them away without the necessity of withdrawing them past the cutter, each workpiece following the closed path indicated by the dot-dash line 41 in Fig. 3.

The cutter supporting spindle 32 is arranged to be adjusted relative to the work table 33 both in vertical direction and transversely of the path of movement of the work holding fixtures through the cutting zone. To provide for the vertical adjustment, the supporting spindle is carried by a spindle head 42 which is slidably mounted on the column 31, a screw and nut mechanism 43 provided with a hand wheel 44 being arranged for moving the head vertically along the column in well known manner. For retaining the head in adjusted position, a pair of spaced clamp bolts 45 and 46 are provided, the two bolts being interconnected in manner to be actuated simultaneously by a single clamping lever 47. To provide for adjusting the spindle transversely of the cutting path, it is rotatably mounted by means of anti-friction thrust bearings in a quill 50 which is slidably mounted for axial adjustment in the spindle head 42, a rack and pinion mechanism 51 being provided for effecting the adjustment in well known manner. A clamping bolt 52 serves to clamp the quill in the sliding head after it has been adjusted to a desired position. The usual overarms 54 are slidably mounted in the upper part of the spindle head 42 in position to carry a depending arbor support 55 in which the end of an arbor 56 carrying a cutter 57 is rotatably supported. Clamping bolts 58 are provided for clamping the overarms 54 in adjusted position in the spindle head.

In operating the machine, the work holding fixture which happens to be in the forward position or loading station may be loaded with a workpiece while the table is turning slowly at feed rate. At the end of the feeding stroke, the table is automatically turned at rapid traverse rate to cause the workpiece to approach quickly to a position closely adjacent to the rotating cutter 57, the workpiece being clamped automatically as the table is turned. The rate of table movement is then automatically changed back to feed rate in order to feed the workpiece along the straight line path through the cutting zone in operative engagement with the cutter 57.

After the workpiece has passed across the cutter, the table is again automatically moved at rapid traverse rate in the same direction to quickly lead away the finished workpiece and bring it around to the forward position for unloading, a new workpiece in the other fixture meanwhile being moved simultaneously into position for feeding to the cutter. By this arrangement, the work table may be turned continuously in the same direction alternately at rapid traverse rate and at feed rate with the cutter rotating continuously at a predetermined speed to effect substantially continuous milling of successive workpieces.

Power for turning the work table 33 and for rotating the cutter spindle 32 is derived from an electric motor 61 which is mounted in the lower part of the column 31, as best shown in Fig. 1.

Referring particularly to Figs. 4 and 5, the shaft of the motor 61 is operatively connected to a worm 62 which meshes with a horizontally disposed worm wheel 63 that is rotatably mounted in the column 31. The worm wheel 63 is internally splined and slidably engages a splined shaft 64 extending vertically to and journaled in the spindle head 42 in manner to be movable vertically therewith, and constituting part of the transmission train for driving the tool spindle 32. As shown in Fig. 4, the vertical shaft 64 is provided at its upper end with a bevel gear 65 which meshes with a pair of complementary bevel gears 66 and 67 rotatably mounted on a horizontal shaft 68 journaled in the head 42. The gear 65 and the cooperating gears 66 and 67 constitute a reversing and disconnecting mechanism for controlling the operation of the spindle 32, a shiftable clutch sleeve 69 being slidably mounted on the shaft 68 between the gears 66 and 67 in manner to be movable into engagement with either one thereof by means of a reversing lever 70 mounted on the side of the head 42, as shown in Fig. 1. The reversing lever 70 may be moved to any one of three positions, two end positions providing selectively for rotation of the spindle 32 in either direction, and a central position providing for entirely disconnecting the spindle drive from the power source.

From the horizontal shaft 68, power is transmitted to the spindle at selected rate through a speed changing mechanism 72 comprising a gear 73 removably mounted on the end of the shaft 68 and meshing with a complementary gear 74 removably mounted on the end of a parallelly disposed horizontal shaft 75, the gears 73 and 74 being enclosed within the head 42, a door 76 providing access to permit interchanging the gears or substituting others therefor in adjusting the spindle speed.

For transmitting power at the selected speed from the horizontal shaft 75 journaled in the head to the axially movable spindle 32, a pair of interlocking gears are provided, including a herringbone gear 78 fixed on the spindle 32 and a complementary herringbone gear 79 intermeshing therewith and slidably splined on the shaft 75 for axial movement relative thereto. Since the herringbone gears 78 and 79 are meshed in interlocking relationship, the gear 79 is caused to slide along the splined shaft 75 whenever the spindle 32 is adjusted axially, the adjustment thus being effected without interfering with the driving connection from the shaft 75 to the spindle. The range of speeds within which the spindle may be operated is determined by the speed ratio of the herringbone gears 78 and 79, the desired speed range being established by providing a pair of these gears of suitable proportions.

The transmission train for transmitting power from the motor for turning the work supporting table at a selected feed rate includes a spur gear 82 formed on the hub of the worm wheel 63, which rotates continuously whenever the motor 61 is operating. As shown in Fig. 5, the spur gear 82 meshes with a mating gear 83 on a vertical shaft 84 that is provided at its upper end with a removable gear 85 constituting part of a feed rate changing mechanism 86. The removable gear 85 meshes with a complementary removable gear 87 on a parallelly disposed vertical shaft 88 which also carries another removable gear 89 meshing in turn with a removable gear 90 on the upper end of a vertically disposed shaft 91. The removable gears 85, 87, 89, and 90 of the rate changer 86 constitute a pick-off rate changing mechanism generally similar to the speed changer 72 and which may be adjusted by interchanging the gears or substituting other appropriate complementary pairs thereof to provide for turning the table 33 at the required feed rate, a cover plate or door being provided for affording convenient access to the removable gears for changing them.

The vertical shaft 91 of the rate changer is provided with a bevel gear 92 which meshes with a complementary bevel gear 93 on the outer end of a feed drive shaft 94 which is journaled in the bed 30 of the machine and carries at its inner end a feed worm 95. The feed worm 95 meshes irreversibly with a horizontally disposed worm wheel 96 that is rotatably mounted by means of anti-friction bearings in the bed 30 and is provided with an internal cylindrical clutching surface 97.

Disposed concentrically with the worm wheel 96 and journaled in the bed separately therefrom is a vertically disposed table driving shaft 98 which is provided at its upper end with a spur pinion 99 meshing with an internal or ring gear 100 secured beneath the lower outer edge of the table 33 and disposed concentrically with the central gudgeon 36. The table driving shaft 98 has fixed on its lower end a driving collar or bushing 102 that is provided around its top edge with a plurality of sloping radially acting cam surfaces 103 constituting the internal member of an overrunning clutch 104. As best shown in Figs. 5 and 7, a plurality of spring-pressed rollers 105 are disposed between the cam surfaces 103 and the internal clutching surface 97 of the worm wheel 96 in such manner that the wheel is adapted to drive the shaft 98 when rotated in one direction, in a well known manner, the clutch 104 functioning to permit the shaft 98 to turn faster than the feed worm wheel 96 when the table is being driven at rapid traverse rate.

For turning the table at rapid traverse rate, there is provided a rapid traverse worm 107 disposed in alignment with the shaft of the motor 61 and operatively connected to the end of the worm 62 by means of an axially movable splined connection or joint 108, as shown in Fig. 5. The rapid traverse worm 107 meshes with a cooperating worm wheel 109, which is rotatably mounted by means of anti-friction bearings in the bed 30 below and concentrically with the feed worm wheel 96. The rapid traverse worm wheel 109 is likewise provided with an internal cylindrical clutching surface 110 for engagement by rollers 111 which cooperate with cam surfaces 112 disposed around the lower edge of the driving collar 102, constituting a clutch or ratchet mechanism 113 generally similar to the overrunning feed clutch 104 but arranged for positive selective engagement to drive the table in the same direction at rapid traverse rate with the clutch 104 overrunning. To effect selective operation of the clutch 113, the rollers 111 are engaged by depending fingers of bars constituting a spacing cage 114 formed on the lower end of a clutch shifting sleeve 115 that is disposed concentric with and encircles the driving collar 102. This arrangement permits positive selective disengagement of the clutch 113 or positive engagement thereof for operating the table at rapid traverse rate.

Inasmuch as the table 33 and the work holding fixtures carried thereby constitute a rotating element having considerable inertia, it is desirable to provide means for absorbing the shock incurred when the rapid traverse clutch 113 is engaged suddenly. To this end, the rapid traversing worm 107 is mounted in manner to be free to slide endwise by reason of the splined connection 108, a spring 118 being provided for normally retaining the worm in central position relative to the worm wheel 109. To prevent the spring 118 from returning the worm 107 beyond its normal position or at excessive speed after the table has been accelerated, a dashpot 119 is provided at the other end of the worm as shown in Figs. 4 and 5. The dashpot functions to trap lubricating oil supplied from a reservoir 120 and to expel it through restricted openings in such manner as to cushion the return movement of the worm.

In order to conserve time during the cutting cycle, it is desirable to have the workpiece approach as close as possible to the cutter at rapid traverse rate and then automatically change the rate of table movement to feed rate for feeding the work into engagement with the cutter without delay. The promptness with which the workpiece may be fed into engagement with the rotating cutter depends upon the accuracy and certainty with which the change from movement at rapid traverse rate to movement at feed rate may be made, since with the change being made close to the cutter any inaccuracy or overrunning of the table might result in the workpiece accidentally engaging the cutter at rapid traverse rate, thereby causing damage to the machine.

To provide for accurately and positively changing the rate of movement from rapid traverse to feed rate, the driving mechanism is equipped with a synchronizing or decelerating positive roller clutch or ratchet mechanism 124 cooperating with the feed worm wheel 96 and generally similar in structure to the rapid traverse clutch 113 but disposed to operate in the opposite direction. The synchronizing or decelerating clutch 124 includes rollers 125 disposed to cooperate with cam surfaces 126, formed on an intermediate part of the driving collar 102, in manner to be forced thereby into engagement with an internal cylindrical clutching surface 127 in the lower part of the feed rate worm wheel 96. For engaging or disengaging the synchronizing clutch 124, a spacing cage 128 similar to the cage 114 is provided on the upper end of the clutch actuating sleeve 115, the arrangement being such that when the sleeve 115 is turned to disengage the rapid traverse clutch 113, it is moved in the direction to engage the synchronizing clutch 124, and since the clutches act oppositely, they may thus be engaged alternatively.

When the synchronizing clutch 124 is engaged, it positively prevents rotation of the table driving shaft 98 at a rate faster than the rate that is established by the feed worm wheel 96. Since the worm wheel 96 and its cooperating feed worm 95 constitute an irreversible drive mechanism, the inertial forces of the rotating table 33 are exerted through the synchronizing clutch 124 upon the feed worm wheel 96 and against the worm 95 in a manner to quickly and positively check the rotative velocity of the table 33 and reduce it to the rate of movement corresponding to the feed rate at which the feed worm wheel 96 is turning, as determined by the feed rate changer 86. As the table driving torque is then exerted through the feed rate overrunning clutch 104, the two roller clutches acting in opposite directions tend to lock the feed worm wheel 96 to the shaft 98 with a positive grip.

The fact that the feed rate driving worm and worm wheel mechanism is irreversible and that it is positively coupled to the table by the overrunning clutch and the synchronizing clutch, makes it possible to operate the machine in a manner to effect climb cutting of workpieces without danger of the table being pulled ahead by the rotating cutter at a rate faster than the predetermined feed rate.

Circumferential shifting movement of the clutch shifting sleeve 115 relative to the driving collar 102 is effected by means of an axially movable shifting collar 131 which encircles the clutch sleeve, as shown in Figs. 4, 7, and 8, and is provided with diametrically opposed inwardly projecting pins 132. As shown in Fig. 8, the pins 132 extend through slots 133 in the clutch sleeve 115 into axially disposed slots 134 in the driving collar 102, the arrangement being such that the shifting collar 131 is caused to rotate with the driving collar 102 and the shaft 98 but is free to be moved axially relative thereto along the slots 134. As shown in Fig. 7, the slots 133 in the clutch sleeve 115 are angularly disposed or pitched in such manner that when the shifting collar 131 moves the pins 132 along the axially disposed slots 134 in the driving collar 102 from end to end thereof, the clutch sleeve 115 is caused to turn relative to the driving collar through a sufficient angle to disengage one of the roller clutches and to engage the other clutch, thereby providing a convenient and effective control mechanism for the roller clutches.

When the shifting collar 131 is moved to its upper position, as shown in Fig. 7, the clutch shifting sleeve 115 is turned in manner to disengage the rapid traverse driving clutch 113, the spacing cage 114 on the lower end thereof moving the clutch rollers 111 into the deep portion of the cam grooves 112, as shown in Fig. 11. With the rapid traverse driving clutch disengaged, the table is driven at feed rate by means of the overrunning feed rate clutch 104, a spring 136 acting upon a spacing cage 137 to force the clutch rollers 105 into wedging engagement between the cam surfaces 103 on the driving collar and the cylindrical clutching surface 97 within the feed worm 96 to effect a driving connection in the manner indicated in Fig. 9.

If it is desired to operate the table at rapid traverse rate, the shifting collar 131 is moved downward, thereby causing the clutch sleeve 115 to turn counterclockwise relative to the driving collar 102 by reason of the action of the pins 132 in the angular slots 133 and the vertical slots 134. This results in moving the rollers 111 of the rapid traverse clutch into wedging engagement between the cam faces 112 and the clutch surface 110 as shown in Fig. 11A. The rollers 111 then effect a connection between the rapid traverse worm wheel 109 and the table driving shaft 98 causing the shaft to rotate faster than the feed worm wheel 96 with the result that the overrunning clutch 104 becomes disconnected or overruns with its rollers disengaged as indicated in Fig. 9A.

In effecting a sudden change in the rate of movement of the table from rapid traverse to feed rate at an accurately predetermined position, the clutch sleeve 115 is caused to turn clockwise by moving the shifting collar 131 upward to the position shown in Figs. 4 and 7, thereby disengaging the rapid traverse clutch 113 as shown in Fig. 11 and immediately effecting engagement of the synchronizing clutch 124 as shown in Fig. 10. As previously explained, this quickly reduces the rate of movement of the table to the speed at which the overrunning feed clutch 104 engages, whereupon the movement of the table is continued at the predetermined feed rate.

In order that the changes in the rate of movement of the table may be caused to occur automatically at accurately predetermined positions, automatic trip mechanism arranged to be actuated by trip dogs carried by the rotary table is provided. As may be seen in Figs. 3, 4, and 12, the ring gear 100 secured beneath the table is provided on its periphery with a circumferentially disposed T slot 141 adapted to receive trip dogs. As shown in Fig. 3, a trip dog 142 in the T slot 141 is adapted to engage a trip arm 143 mounted on the upper end of a trip shaft 144 that is vertically disposed at its lower end with an arm 145 which carries a shoe 146 engaging a notch in a horizontally disposed push rod 147 slidably mounted in the machine bed 30 as shown in Fig. 5. The push rod 147 is provided at its other end with a notch 148 which engages the upper end of an arm 149 on a shaft 150, as shown in Fig. 6. The shaft 150 is rotatably mounted in the machine bed 30, as shown in Figs. 4 and 5, and is provided at its inner end with a shifting fork 151 carrying shoes 152 which engage a groove 153 in the periphery of the clutch shifting collar 131, as best shown in Figs. 7 and 8. The shoes 152 engage the groove 153 in manner to permit the collar to rotate with the clutch mechanism by the shaft 98, and upon turning movement of the shaft 150, they operate to move the shifting collar vertically.

The arrangement of the automatic trip mechanism is such that when the dog 142 engages the arm 143 and forces it outward, the shaft 144 is turned in manner to effect movement of the shifting collar 131 to its upper position, thereby disengaging the rapid traverse driving clutch 113 and engaging the synchronizing clutch 124 in manner to cause the rate of movement of the table to be reduced to feed rate substantially instantaneously. For automatically effecting engagement of the rapid traverse drive, another dog 155, provided in the T slot 141, is operative to engage a trip lever 156 mounted on the upper end of a vertical shaft 157 shown in Fig. 5 and provided with a pinion 158 meshing with a gear segment 159 fixed on the shaft 144, the arrangement being such that the trip arm 156, when engaged and moved outward by the dog 155, turns the shaft 144 in direction opposite to that in which it is turned by outward movement of the arm 143, thereby causing the shifting collar 131 to be moved downward to disengage the synchronizing clutch 124 and to engage the rapid traverse rate driving clutch 113. As shown in Fig. 5, the arm 145 is provided at its outer end with angularly disposed cam faces 160 constituting a detent point 161 that is engaged by a roller 162 on the end of a pivoted arm 163. The arm 163 is urged by a spring 164 in direction causing the roller 162 to act on one or the other of the cam faces 160 in manner to force the detent arm 145 in one or the other direction to positively engage a selected one of the roller clutches. By this arrangement any wear which occurs in the clutches is automatically taken up by the spring 164. Further, the spring 164 effects engagement of one or the other clutch as soon as the arm 145 has been moved by the trip arm 143 or the trip arm 156 a sufficient distance to move the centrally disposed detent point 161 at the junction of the cam faces 160 beneath the roller 162, the roller 162 then being forced against the other cam face by the spring 164 causing the arm 145 to quickly complete its movement.

Because of the action of the synchronizing clutch 124 in quickly reducing the rate of movement of the table, the feed dog 142 may be set at such position that a workpiece held in the work holder 35, for instance, may be caused to approach at rapid traverse rate to a position quite close to the cutter before the rate of movement is changed to feed rate. By this arrangement, loss of time in moving the table at feed rate for a considerable distance before the work engages the cutter is avoided. Since the two work holders 34 and 35 are disposed at opposite ends of the cross slide, the table is provided with two sets of trip dogs 142 and 155 disposed at diametrically opposed positions thereon, as shown in Fig. 3. The accurate action of the trip mechanism in co-operation with the positively actuated roller clutches constitutes in effect an indexing operation definitely positioning each successive workpiece relative to the cutter.

The angular distances through which the table is turned at feed rate and at rapid traverse rate respectively with the trip dogs in the position shown, are set off by the dot-dash lines 165 and 166 in Fig. 3. As there indicated, the table is turned through the angle A at feed rate in moving the forward work holder through the loading position, and is then turned at rapid traverse rate through the angle B in moving the loaded work holder up to the feeding position adjacent to the cutter. In feeding the workpiece across the cutter, the table turns through the angle C at feed rate, and after the cutting operation is completed the table is moved at rapid traverse rate through the angle D to lead the finished workpiece away from the cutting zone and bring it around to the forward station for unloading.

Since the operations of unloading the finished workpiece and replacing it with a fresh workpiece are performed by the machine attendant during the time that another workpiece is being fed through the cutting zone, it sometimes happens that the time taken by the table in moving through the cutting stroke is not sufficient for completion of the loading operation. In this event the machine attendant may prolong the feeding movement and prevent or delay shifting to the rapid traverse rate of movement, as long as may be necessary to complete the loading operation, by merely depressing a pedal 171 pivotally mounted on the front of the machine, as shown in Figs. 1 and 12.

The pedal 171 is connected by a link 172 to an arm 173 mounted on a shaft 174 which extends horizontally into the machine bed 30 as shown in Fig. 5. The shaft 174 carries a depending arm 175, the lower end of which engages a notch 176 in a plunger 177 that is slidably mounted in the bed 30, as shown in Figs. 5, 12, and 13. When the pedal 171 is depressed, the shaft 174 is turned clockwise as seen in Fig. 12, and the plunger 177 is moved to the left beneath the shifting collar 131 in manner to prevent it from being shifted downward from the feed rate position to the rapid traverse rate position thereby restraining the mechanism from operating at rapid traverse rate. Since the final movement of the shifting collar 131 is effected by the spring 164 acting on the detent point 161 of the arm 145, interference with the movement of the shifting collar by the plunger 177 does not obstruct the action of the trip dogs 142 and 155. To this end, the trip mechanism may be so adjusted that the shifting collar 131 is not moved a sufficient distance to shift the clutches until after the detent point 161 passes the spring urged roller 162. For this purpose, the arm 149 which is engaged by the push rod 147, as shown in Fig. 6, is rotatably mounted on the shaft 150 and arranged to be engaged by set screws 181 and 182 carried in a bifurcated bracket 183 keyed on the shaft 150, the arrangement being such that the angular relationship of the arm 149 and the shaft 150 may be adjusted to effect precisely the desired action of the trip mechanism.

The inner or forward end of the plunger 177 is provided with a spring urged rotatable bolt or roller 184 that enters beneath the shifting collar 131 as shown in Fig. 13 when the pedal is depressed. In the event that the collar 131 is being shifted toward, or has already been shifted into rapid traverse position before the pedal is depressed, the roller 184 may not pass beneath the collar but may first be forced against it yieldingly by means of a spring 185, the end of the roller engaging the periphery of the collar. As the collar 131 turns with the table driving shaft, the roller will then be forced by the spring into one or another of a plurality of cam notches 186 in the lower edge of the collar, each of which presents an inclined face 187 adapted to engage the roller 184 and coact with it in manner to lift the collar, thereby shifting the clutches from rapid traverse position to feed position. The end of the roller 184 then passes farther beneath the collar 131 into rolling engagement with a horizontal circular face 188 thereof, as shown in Fig. 13, thereby retaining the collar in its upper or feed position. After the loading operation has been completed, the attendant releases the pedal 171, and a spring 189 on the end of the plunger 177 opposite from the clutch mechanism withdraws the roller from beneath the collar 131, thereby permitting the detent spring 164 to complete the clutch shifting operation previously initiated to engage the rapid traverse drive; a collar 190 being provided on the plunger 177 to limit its outward movement as shown in Fig. 5. The rapid traverse movement of the table then continues with the workpiece approaching the cutter at rapid traverse rate until one of the feed dogs 142 engages the feed trip arm 143 and shifts the collar 131 upward to feed position. If it is desired to effect shifting of the feed and rapid traverse clutch mechanism manually, a hand lever (not shown) may be applied to the squared upper end 191 of the control shaft 144 shown in Figs. 3 and 12, to turn it from either position to the other.

Referring particularly to Figs. 4 and 12, the work carrying table 33 is rigidly supported for rotation in a horizontal plane by means of bearing surfaces 194 disposed on the top of the bed 30 in position to support the outer edges of the table closely adjacent to the driving ring gear 100. The central gudgeon 36 which pivotally supports the table is downwardly tapered in shape and is rotatably journaled in a complementary tapered pivot bearing or sleeve 196 adjustably mounted in the bed 30 of the machine. To insure accurate and rigid support of the table in its pivot bearing, the lower end of the tapered gudgeon 36 is provided with a retaining nut 197 which may be turned to hold the gudgeon in snug engagement with the tapered bearing sleeve 196, the sleeve being adjustably positioned in the bed 30 by means of shims 198 for establishing the proper fit with the gudgeon and held in adjusted position by bolts 199.

As may best be seen in Figs. 12 and 16, the work holder carrying slide 37 is mounted for movement diametrically of the table 33 by means of ways 200 on the top of the table which are engaged by gibs 201 on the slide to constitute a sliding bearing or connection of well known type. As best shown in Fig. 4, each of the work holding fixtures 34 and 35 is rotatably mounted near one end of the slide 37 by means of vertically spaced anti-friction bearings 203 and 204 in such manner that it is rigidly supported on the slide and yet is free to be turned about its vertical pivot axis. The studs 38 and 39, depending from each of the fixtures 34 and 35, are each provided at the lower end with two superimposed rollers 206 and 207 mounted on ball bearings and disposed to engage the cam surfaces for guiding the work holding fixtures through the cutting zone. Since the rollers engage the guiding cams with rolling action, the amount of wear on the cams is reduced to a minimum, and consequently the accuracy of the cams in guiding the work is less likely to be impaired than would be the case if sliding cam followers were used.

As may best be seen in Fig. 4, the lower rollers 207 on both studs 38 and 39 engage and roll upon the straight line guiding cam 40 while the work holding fixture is being moved through the cutting zone. Although the cam 40 is shaped to guide the work holding fixture along a straight line, it will be understood that the work holders may be moved along a curved line or a line having any other shape to effect cutting of the work according to any predetermined configuration by substituting a cam track of the required shape. As best seen in Figs. 15 and 16, the upper rollers 206 engage and roll upon the periphery of a central cam 209 which completely encircles the gudgeon bearing 196 and constitutes a cam track for guiding the work holding fixtures as they are being moved from the cutting zone through the loading station and back to the cutting zone.

The cam rollers on the studs 38 are disposed concentrically with the bearings 203 and 204 which pivotally support the work holding fixture, and they are maintained in contact with the surface of the cam 209 at all times by reason of the fact that the cam is shaped to provide a constant diameter at all angular positions. However, the studs 39 are not constrained in this manner to any predetermined path of movement, since the work holders may be pivoted about the axes of the studs 38. In order to retain the upper rollers 206 on the studs 39 in contact with the cam 209, each of the work supporting fixtures 34 and 35 is provided with a gear segment 211, as shown in Fig. 14, which meshes with rack teeth on a rod 212 mounted for endwise sliding movement in the slide 37 and provided with a compression spring 213 arranged to exert force in direction tending to turn the work holders clockwise as seen in Figs. 14 and 15, to force the rollers 206 on the studs 39 into engagement with the cam 209.

In moving the workpiece through the cutting zone, it is necessary that the work holding fixture be supported as rigidly as possible to prevent any movement which might result in inaccuracies or vibration of the workpiece. For this purpose, the inner cam 209 is provided with a straight line portion 214, as shown in Fig. 15, disposed parallel with and slightly above the straight line guiding cam 40 and in such position that as the lower rollers 207 roll along the cam 40, the upper rollers 206 engage and roll along the straight portion 214 of cam 209, as shown in Fig. 4, in manner to positively guide the work holder along the straight line path past the cutter 57. The rollers 206 and 207 on the studs 38 and 39 are wedged between the cam surfaces 40 and 214 in manner to effect rigid support of the work holding fixtures, and in addition a hydraulic cylinder 215 provided with a piston 216 is mounted in the central part of the table and is operative to exert a force in the direction tending to move the slide 37 to the right, as seen in Fig. 4, to ensure firm engagement with the straight line guiding cam 40 and to prevent any slight tilting movement or vibration of the work holder which might otherwise occur by reason of clearances in the bearings supporting the work fixture and the rollers.

Since the work holding fixture does not move along a straight line until after the rollers on both the stud 38 and the stud 39 engage the straight cams 40 and 214, the length of the straight line path of movement is shorter than the straight portion 214 of the cam 209 by an amount equal to the distance between the centers of the studs. The length of the straight line path of movement is indicated in Figs. 3 and 15 by the dimension E, and since the work holding fixture is mounted concentric with the leading stud 38, the straight line motion does not begin until the work holder has moved along the cam 40 far enough to bring the rollers 207 on the trailing stud 39 into engagement with the straight line cam 40 also. Consequently the straight line path of movement is offset somewhat relative to a vertical plane longitudinally of the machine through the center of the rotating table, as appears in Figs. 3 and 15. In order that advantage may be taken of the full length of the straight line movement, the cutter spindle 32 is correspondingly offset relative to the center of the table 33 as best shown in Fig. 3. Further, in order that the spindle 32 may be positioned to rigidly support the cutter 57 as near as possible to the straight line cutting zone E, the spindle carrying head 42 is provided with a forwardly projecting or overhanging supporting portion 218, as shown in Figs. 1, 3, and 4, which is disposed to overlie the outer edge of the rotating table 33 in order to support the cutter spindle at a position as near as possible to the work.

Each of the work holding fixtures 34 and 35 is arranged to carry a suitable work clamping device such as a vise 220. As shown in Figs. 1, 3, 4, 12, and 16, the vises 220 are mounted on the respective work holding fixtures in manner to be adjusted angularly thereon and are secured in adjusted position by means of bolts 221, the heads of which engage circular T slots 222 in the upper surfaces of the fixtures. Referring particularly to Figs. 3, 4, and 16, each of the vises includes a body portion 224 carrying a fixed jaw 225 and a slidable jaw 226 arranged for relative cooperating movement to effect clamping of workpieces therebetween, the movable jaw 226 being carried by a sliding member or slide 227.

In operating the machine, a workpiece is placed between the fixed jaw and the movable jaw while the fixture is in the loading position, and then as it moves toward the cutting zone the work is automatically clamped by hydraulic pressure means. For this purpose, each work holding fixture is provided with a central vertically disposed hydraulic cylinder 230 provided with a piston 231 having an upwardly extending piston rod 232 which engages a roller 233 on one end of a pivoted lever 234 mounted in the vise. When pressure is admitted to the cylinder 230 to move the piston 231 upward, the piston rod 232 pivots the lever 234 counterclockwise, as appears in Fig. 16, causing a lug 235 thereon to engage a notch in the slide 227 in manner to move the jaw 226 toward the jaw 225.

The relative positions of the jaws 225 and 226 may be adjusted to adapt them to clamp a workpiece of predetermined size. This adjustment may be effected by moving the jaw 226 relative to the slide 227 to engage depending teeth 236 on the jaw in any one of a plurality of notches 237 in the slide 227, as shown in Fig. 16, to constitute a rough adjustment, the jaw being retained on the slide by tightening a bolt 238. To provide for effecting a fine adjustment, the fixed jaw 225 is carried by a bracket 239 provided on its lower face with serrations 240 which engage complementary serrations 241 in the upper face of the vise body 224, as shown in Figs. 3 and 12. The bracket 239 is provided with an adjusting screw 242 which engages the back of the jaw member 225 for moving it precisely to the desired position, bolts 243 being provided for clamping both the jaw 225 and the bracket 239 to the vise body 224 in the adjusted position.

When the clamping pressure in the cylinder 230 is released, a tension spring 245 draws the piston 231 downward in the cylinder 230, and a spring 246 in the vise body moves the sliding member 227 in direction to withdraw the movable jaw 226 from the stationary jaw 225. When relatively small workpieces are being machined, it is desirable to limit the extent of opening of the jaws to prevent the workpieces from dropping into the opening between them. For this purpose a stop member 248 (Fig. 16) is adjustably fastened to the sliding member 227 by screws 249 in manner to engage the vise body 224 when the jaws have been opened to the predetermined position. In the event that a clamping or holding arrangement other than an automatically actuated vise is to be utilized, a plate or the like may be secured to the top of the work holding fixture in position to retain the piston rod 232 and the piston 231 in retracted position within the cylinder 230, the hydraulic pressure being admitted as usual to the cylinder without effecting movement of the piston.

Chips which result from a machining operation on a workpiece in the cutting zone, drop from the table 33 into a peripherally disposed trough 255, shown in Figs. 3, 4, and 12, the bottom of which slopes downwardly from the right side of the bed 30 toward the left rear corner thereof. As may be seen in Figs. 3 and 12, this corner of the bed is provided with a well or depression 256, the bottom and rear side walls of which are formed by foraminated plates 257 and 258 respectively which serve as screens to drain coolant fluid from the chips into a coolant chamber 259 in the base of the bed 30. The chips which accumulate in the well 256 may be removed from time to time by means of a shovel or other suitable tool passed through an opening 260 in the forward wall of the bed which opens into a downwardly sloping passageway 261 leading to the well 256. A depending apron or shield 262 carried by the vertically movable spindle head 42 projects downward into the trough 255 in position to guard the bearing surfaces on the column 31 from the chips.

Hydraulic pressure for actuating the stabilizing piston 216 and the vise clamping pistons 231 is derived from pumps 264 and 265 which are mounted in and carried bodily by the gudgeon 36. By this arrangement the hydraulic pressure may be conducted to the cylinders by means of comparatively short passageways, and the control of the system may be effected by a valve mechanism formed in the gudgeon 36 and its cooperating bearing sleeve 196, the valve being operative to effect movement of the actuating pistons in accordance with the angular position of the table 33. As may be seen in Figs. 4, 12, 21, and 22, the pumps 264 and 265 are of the gear type and are mounted one above the other with the driving gears thereof disposed in alignment and concentrically with the axis of rotation of the table supporting gudgeon, the arrangement being such that a shaft 266 connected with both of the driving gears extends concentrically through the gudgeon 36 and depends therefrom to provide a driving connection for actuating both pumps.

The pump driving shaft 266 is coupled to a horizontally disposed worm wheel 267 that is journaled in the bed 30 in meshing engagement with a driving worm 268, as appears in Fig. 5. The pump driving worm 268 is operatively connected for rotation with the rapid traverse rate driving worm 107 by means of a key 269 carried by the body of the dashpot 119, the connection being such that both the pump 264 and the pump 265 are driven whenever the motor 61 is operating. As shown in Fig. 12, the pumps 264 and 265 are supplied with actuating liquid such as ordinary lubricating oil, from a sump 271 through a suction pipe 272, the oil from the pumps being distributed under pressure to the various parts of the machine in well known manner for effecting lubrication of the mechanism in addition to serving as actuating liquid for the hydraulic cylinders.

The worm wheel 267 likewise serves to drive a coolant pump 274 shown in Figs. 4 and 5, that has a driving shaft 275 which may be selectively connected to the worm wheel 267 by means of a clutch 276. As shown in Fig. 4, the clutch 276 may be shifted by means of a rock shaft 277 extending to the front of the machine and having a slot 278 for engagement by a screw driver or the like, a spring pressed detent mechanism 279 being provided for retaining the clutch in either the engaged or the disengaged position. The coolant pump 274 is mounted in the coolant chamber 259 and functions to deliver coolant to the milling cutter 57 in a well known manner, the coolant returning through the chip trough 255 to the chamber 259 as previously explained.

When the motor is operating and the pumps 264 and 265 are functioning, as previously mentioned with reference to the hydraulic apparatus shown in Fig. 12, the oil drawn from the sump 271 through the pipe 272 passes into an annular groove 281 in the bearing sleeve 196 which communicates at all times with a passageway 282 in the gudgeon 36 that leads to the pumps. From the pump 265 the oil is forced under pressure through a passageway 283 (Figs. 12 and 22) leading to a pressure regulating or relief valve 284. Oil in excess of that required to maintain a predetermined operating pressure in the passageway 283 escapes through the relief valve 284 into a passageway 285 which leads to an oil filter 286 (Fig. 1) and thence into the lubricating system of the machine.

When the rotary table 33 is in the position shown in the drawings, with the work holding fixture 35 passing through the cutting zone E, the passageway 283 from the pump 265 is positioned as shown in Figs. 12 and 22 to communicate with a groove 287 in the sleeve 196 which communicates through passageways 288 with a similar groove 289 at a diametrically opposite position. The groove 289 communicates with a passageway 291 in the gudgeon 36 that passes upwardly through the gudgeon to the stabilizing cylinder 215.

As appears in Fig. 4, pressure exerted through the passageway 291 enters a narrow groove 292 in the bottom of the cylinder 215 which communicates with a port 293 in the piston 216 connecting with a longitudinal passageway 294 therein through which the oil flows to the left end of the cylinder and exerts pressure upon the piston 216 in direction to move it to the right, in manner to force the slide 37 to the right as previously explained for firmly engaging the cam following rollers on the fixture 35 with the straight line guiding cam 40. Oil from the right end of the cylinder 215 escapes through a port 295 in the top of the cylinder into a reservoir 296 which serves to maintain the cylinder full of oil at all times and prevents the entrance of air into the system, the oil which overflows from the reservoir 296 returning to the sump 271.

The hydraulic system is shown schematically and somewhat more fully in Fig. 28 in which the pivot bearing 196 constituting the valve sleeve is shown developed, and the passages in the gudgeon 36 are indicated as tubes superimposed upon the developed sleeve. As there shown, the valve grooves 287 and 289, with which the passageway 283 from the pump and the passageway 291 to the stabilizing cylinder 215 communicate respectively when the valve is in the position shown, appear as relatively short openings connected by the passageways 288 shown dotted along the back of the sleeve. When the table is turned in moving a work fixture out of the cutting zone E, the passageway 283 from the pump 265 moves out of communication with the groove 287 thereby cutting off the pressure to the stabilizing cylinder 215.

As may be seen by referring to Fig. 15, at the time that the work fixture moves out of the cutting zone the roller 206 on the stud 38 thereof passes from the straight line portion 214 of the cam 209 to an arcuate portion thereof, the radius of which is such that the work supporting slide 37 assumes a central position on the table 33. Under this condition, the piston 216 is moved to a central position within the cylinder 215 as shown in Fig. 29, in which position both the inlet port 292 and the exhaust port 295 are closed. As the table 33 continues to turn in moving the work fixture to the unloading position, the piston 216 is moved in the same direction past the center position, thereby moving a port 298 into communication with the inlet port 292 at the time that the passageway 291 in the gudgeon moves into communication with the groove 287 in the sleeve, and the passageway 283 from the pump moves into communication with the groove 289. Further movement of the piston 216 then causes oil in the right end of the cylinder 215 to flow through a longitudinal passageway 299 in the piston which connects with the port 298, and then out through the port 292 and back through the passageway 291 against the pressure exerted by the pump 265, the excess oil escaping through the relief valve 284. This expulsion of oil from the cylinder 215 back against the pump pressure occurs most rapidly at the time that the work supporting fixture approaches the cutting zone at rapid traverse rate; consequently the cylinder 215 and the piston 216 function as a dashpot in checking the speed of the rotary table and in cushioning the transition from movement at rapid traverse rate to movement at feed rate. By the time that the succeeding work supporting fixture 34 has moved into the cutting zone E at feed rate, the piston 216 has been moved back by the straight line cam 40 to the end of its stroke and is beginning to move forward again under the pressure admitted through the passageway 291 and the port 292, which acts upon the piston 216 in direction tending to force the guiding rollers against the straight line cam 40 as previously explained. The piston, being symmetrically formed, functions in the same manner when moved to either side of the mid-position in which it is shown in Fig. 29 and acts with equal effectiveness upon either work fixture.

Before the rotary table 33 arrives at the point at which a work holding fixture enters the cutting zone, the vise of the work holder is closed to clamp the workpiece, as previously explained. To effect the clamping operation quickly, a relatively large volume of actuating liquid is admitted to the cylinder 230 associated with the vise. At this position of the gudgeon, the passageway 283 from the pump 265 is in communication with an arcuate groove 302 in the sleeve 196 shown in Figs. 22 and 28, thereby placing it in communication with a port 303 leading into a passageway 304. The passageway 304 communicates with groove 305 in the sleeve which connects with a passageway 306 leading to the cylinder 230 of the work holding fixture 35.

The pump 265 is of the type adapted to deliver a relatively large quantity of oil at relatively low pressure, and consequently the piston 231 is moved upward at relatively rapid rate to quickly clamp the workpiece lightly in the jaws of the vise. As the work holding fixture 35 enters the cutting zone, the passageway 283 from the pump and the port 303 move out of communication with the groove 302 as indicated in Fig. 28. Under these conditions, pressure is supplied to the cylinder 230 from the pump 264 which discharges directly into the passageway 304. The pump 264 is of the type supplying a comparatively small quantity of oil at relatively high pressure, the high pressure oil passing through the passageway 304, the groove 305, and the passageway 306 to the cylinder 230 in manner to exert firm clamping pressure upon the workpiece in the vise.

In order that the clamping pressure may be adjusted to suit the particular workpiece being clamped, an adjustable pressure regulator 310 is provided and connected in manner shown in Fig. 28. As there shown, a passageway 311 which communicates with the groove 305 leads to a spring pressed pressure regulating plunger 312 in the regulator 310.

As the work holding fixture 35 moves out of the cutting zone, the passageway 304 moves out of communication with the groove 305, and an exhaust passageway 314 moves into communication with the groove 305 thereby permitting the escape of oil from cylinder 230 through the passageway 306 and groove 305, into passageway 314, which leads to the inlet passageway 282 communicating with the inlet sides of the pumps. The discharge passageway 283 for the pump 265 next moves into communication with a groove 316 similar to and diametrically disposed from the groove 302, which again places it in communication with the port 303 and the passageway 304. The passageway 304 is then in communication with a groove 317 which connects it to a passageway 318 leading to the cylinder 230 associated with the work holding fixture 34, in manner to quickly fill this cylinder with low pressure oil. After the port 303 moves out of communication with the groove 316, high pressure oil from the pump 264 passes through the passageway 304, the groove 317, and the passageway 318 in manner to exert clamping pressure upon the piston 231.

From the groove 317 a passageway 319 leads to the pressure regulator 310, where it communicates with another spring pressed regulating plunger 320. The springs of both the plunger 312 and the plunger 320 may be regulated simultaneously by turning a hand wheel 321 which has a screw thread connection with an adjusting block 322 that engages both the springs. By this arrangement the clamping pressures exerted upon the two clamping pistons may be adjusted simultaneously to effect the same clamping pressure in both the vises, the two systems being maintained independent of each other to provide for release of excessive pressure from either clamping cylinder at any time, the liquid in excess of that required to maintain the predetermined pressure escaping through a passageway 323 which is arranged to discharge into the sump 271.

In order that the clamping pressure in the cylinders may be ascertained readily, a pressure gauge 330 is provided on the machine and connected in manner to indicate the pressure being exerted upon the active clamping piston. For this purpose, a passageway 331 connected with the passageway 311, and a passageway 332 connected with the passageway 319, lead to opposite ends of a ball valve mechanism 333 to the center of which the pressure gauge 330 is connected by a passageway 334. A ball 335 which is free to move lengthwise of the chamber within the valve 333, permits the oil to flow from whichever line may be under pressure to the gauge 330 but prevents the oil from passing through the valve into the other line.

The passageways 306 and 318 which lead from the grooves 305 and 317 respectively to the cylinders 230 associated with the work holding fixtures 34 and 35, are each formed partly in the gudgeon 36 as shown in Fig. 12 and constituted partly by a flexible connecting member arranged for establishing connection from the gudgeon to the relatively movable work support. The flexible connecting mechanism includes a hollow stud 340 depending from the table 33 and connected to the passageway extending through the gudgeon, as shown in Fig. 12 with regard to the passageway 306. The stud 340 is pivotally connected to a hollow block 341 arranged to slidingly receive a tube 342, as best shown in Figs. 15 and 16, which is provided with an enlarged head 343 that is rotatably secured to the lower end of the stud 38 constituting the pivot axis of one of the work holding fixtures. As appears in the drawing, the stud 38 is formed hollow to provide communication with the cylinder 230 which is disposed concentrically therewith.

As a modification, the mechanism for prolonging the feed rate movement of the table to lengthen the loading period may be constituted as part of the hydraulic system, being arranged to be actuated hydraulically as shown in Figs. 23 and 24. As there shown, the actuating pedal 171 is pivotally mounted upon a control unit 346, which may be attached to the front of the machine, and is operatively connected to an arm 347 within the unit which engages one end of a spring pressed valve plunger 348. When the pedal 171 is depressed, the valve plunger is moved upward within a cooperating valve casing 349 to a position in which a groove 350 on the plunger effects a connection between a passageway 351 leading from a pump which may be taken to represent one of the pumps mounted in the gudgeon 36 or any other suitable source of pressure, and a passageway 352 leading to a plunger actuating cylinder 353. Within the cylinder 353 the pressure fluid acts upon a piston 354 which is provided with a hollow piston rod 355 corresponding with the plunger 177 shown in Fig. 13 and carrying at its forward end the spring-urged roller 184 which is adapted to enter beneath the shifting collar 131 as shown in Fig. 24, when the piston 354 is moved forward within the cylinder 353 by the pressure fluid. When the pedal 171 is released, the valve plunger 348 is moved downward by a spring 357, thereby cutting off communication with the pressure passageway 352 and establishing communication with an exhaust passageway 358 in manner to permit the pressure to escape from the cylinder 353. A spring 359 in the cylinder 353 then moves the piston to the right as shown in Fig. 23 in manner to withdraw the roller 184 from beneath the shifting collar 131, thereby permitting it to move downward and lift the drive mechanism in direction to engage the rapid traverse drive.

The electric driving motor 61 is controlled by means of push buttons mounted in a convenient location at the front of the machine, as shown in Figs. 1 and 3. The electrical control system for the motor is shown schematically in Fig. 17, in which a source of power is indicated by power line conductors 361, 362, and 363 which are normally connected by means of a main switch 365 to line conductors 371, 372, and 373 leading to the control mechanism within the machine. The line conductors 371, 372, and 373 connect respectively with terminals 374, 375, and 376 of a motor starting switch 377 provided with an operating solenoid 378. In order to start the motor, a normally open push button switch 380 is closed to complete a starting circuit from the line conductor 371 through a conductor 381, the push button switch 380, a conductor 382 leading to the solenoid 378, and thence by a conductor 383 to the line conductor 372, thereby energizing the solenoid 378 and closing the switch 377. With the switch 377 closed, a holding circuit is established from the line conductor 371 through a conductor 385 to a terminal 386 of the switch which is connected to a terminal 387 by the closed switch and thence through a conductor 388 and a normally closed push button switch 389 to the conductor 382, the circuit being completed through the solenoid 378 and the conductor 383 to the line conductor 372. With the switch 377 in the closed position, the line conductors 371, 372, and 373 are connected respectively with conductors 391, 392, and 393 which lead to the motor 61, the connections being such that the motor is caused to turn in the proper direction for turning the table 33 counterclockwise as indicated by the arrows in Figs. 3 and 17.

To stop the machine, the stop push button 389 is depressed, thereby opening the holding circuit through the solenoid 378 and permitting the switch 377 to drop to its open position. Since it is desirable to provide means for stopping the machine instantaneously, the switch 377 is so arranged that when it is in the open position, it effects a connection which functions to reverse the driving motor 61, thereby quickly checking its speed. For this purpose there is provided a contact member 395 which is connected, when the switch 377 is in the open position, with a contact member 396, thereby completing a circuit from the line conductor 373 through a conductor 397, the contact members 395 and 396, a conductor 398, a solenoid 399 constituting the actuating member of a reversing switch 400, and thence through a conductor 401, a switch 402, and a conductor 403 to the line conductor 372. With the solenoid 399 energized in this manner, the reversing switch 400 is closed and bridges contact members which connect the line conductor 371 to the motor conductor 393, the line conductor 372 to the motor conductor 392, and the line conductor 373 to the motor conductor 391, thereby energizing the motor 61 in manner tending to cause it to rotate in the reverse direction. However, since it is not desired to effect reversal of the machine, the switch 402 is arranged to open upon the first movement of the motor 61 in reverse direction. This results in opening the circuit through the reversing switch solenoid 399, thereby deenergizing it and permitting the switch 400 to open and disconnect the motor 61 from the line conductors.

The switch 402 is shown in detail in Figs. 1 and 2 and includes a friction band 405 which engages with a friction element 406 mounted on the exposed end of the shaft of the motor 61. When the motor is running in its forward direction, friction between the member 406 and the band 405 tends to turn the band counterclockwise as seen in Fig. 2 and to exert force through a link 407 against one end of a pivoted lever 408, the other end of which carries a contact member 409 which is thereby moved into position to bridge contacts 410 of the switch 402, thereby maintaining the switch closed as long as the motor is running forward. However, when the motor is reversed by opening the switch 377 and closing the switch 400, the band 405 turns clockwise with the friction element 406, thereby exerting a pull on the link 407 and pivoting the lever 408 in manner to disengage the contact 409 from the contacts 410, thereby deenergizing the reversing switch 400 and disconnecting the motor from the power source.

As appears in Fig. 3, the starting switch 377 and the reversing switch 400 are mounted on a control panel 412 which is mounted in a housing or compartment 413 formed in the column 31. The compartment 413 is provided with a hinged door 414 by means of which access may be had to the control panel 412, the door being normally closed to protect the electrical equipment from moisture and oil or other injurious foreign matter. In this figure of the drawings, the line conductors are represented by an incoming cable 415 and the motor conductors by a cable 416 which leads down into the lower part of the column and is there connected to the motor 61 as indicated in Fig. 4. The control conductors leading to the push buttons at the front of the machine are represented by a cable 417 which extends forward through a conduit 418 formed in the left side of the bed 30. The conduit 418 is formed in the bed 30 by placing a tube, preferably an iron pipe, in the mold for the bed at the desired position and then casting the bed in manner to enclose the tube within the wall of the bed, as appears in Fig. 3.

For protecting the machine operator from chips or cutter coolant which may be thrown from the rotating cutter, a chip guard structure is provided around the cutting zone as shown in Figs. 1 and 3. The guard structure includes a removable back plate 420 that cooperates with the apron 262 in closing the back of the machine, one edge of the plate being slidably fitted in a groove in the right side of the vertically movable head 42 and the other edge thereof being fitted in a slot in a corner post 421 removably mounted in the right rear corner of the bed 30. The sides of the bed 30 are enclosed by removably mounted side plates 422 and 423 respectively, the plate 422 being slidably engaged in a groove of the corner post 421 and a similar groove in a forward corner post 424, while the plate 423 is fitted at one edge in a slot 425 in the column 31 (Fig. 12) and at its other edge in a slot in another forward corner post 426. The plates 420, 422, and 423 are readily removable by sliding them upward in their retaining slots to provide access to the cutting zone for changing cutters or the like.

As appears in Figs. 1, 3, and 25, the front of the cutting zone is guarded by means of a glass shield 428 which extends across the machine between the two front corner posts 424 and 426. This shield consists of a crossbar 429 carrying three depending glass panels 431, 432, and 433, the panels being preferably formed by non-shatterable safety glass and arranged as best shown in Fig. 25. The ends of the crossbar 429 have threaded engagement with adjusting screws 434 and 436 carried by the corner posts 424 and 426 respectively, the screws being operative to move the shield vertically for adjusting its position to correspond with the vertical position of the cutter 57. The center panel 432 may be fixed to the crossbar 429, but the end panels 431 and 433 are preferably pivotally mounted thereon in order that they may swing freely in the event they should be struck by a workpiece, to obviate danger to the machine or injury to the operator. The corner posts 424 and 426 are fitted in sockets 438 in the top of the machine bed 30 in such manner that they may be removed readily whenever it is desired to remove the front shield 428 from the machine, the entire shield being lifted as a unit to withdraw the corner posts from their sockets.

Another type of work clamping device for mounting on the work holding fixtures 34 and 35 is illustrated in Figs. 26 and 27. This device is designated generally by the reference numeral 440, and it is generally similar to and constitutes a modification of the vise 220 shown mounted on the machine in Figs. 1, 3, and 4. The modified vise 440 is adapted to be mounted on a work holding fixture for angular adjustment in manner similar to that in which the vise 220 is mounted, and it comprises essentially a body portion 444 carrying a fixed jaw 445 and a slidable relatively movable jaw 446, a pivoted lever 448, similar to the lever 234 in the vise 220 being provided for engagement by the actuating piston rod 232 for moving the jaw 446 toward the jaw 445, in the manner previously explained in connection with the vise 220, for clamping a workpiece therebetween.

The modified vise 440 differs from the previously described vise 220 primarily in that a compression spring 450 is provided for urging the vise jaws together to lightly clamp a workpiece prior to the application of the hydraulic clamping pressure. As may be seen in Fig. 27, the spring 450 acts upon the movable clamping jaw 446 in direction tending to urge it toward the fixed jaw 445, an adjusting plug 451 being provided for adjusting the tension of the spring. In order to remove a workpiece from the vise 440, manually actuated means are provided for overcoming the clamping force of the spring 450. For this purpose an actuating eccentric or cam 453 is rotatably mounted in the body 444 of the vise and is provided with an actuating hand lever 454, the arrangement being such that when the lever 454 is turned from the position shown in full lines in Fig. 26 to the dotted line position, the eccentric 453 is turned in manner to engage the slide carrying the movable jaw 446 and move it away from the fixed jaw 445 against the resistance of the spring 450. After a finished workpiece has been removed and a new workpiece placed in the vise, the hand lever 454 is moved back to the position shown in full lines, thereby releasing the movable vise jaw and permitting the spring 450 to exert force for clamping the workpiece lightly between the jaws. With the workpiece thus held in position in the vise, the work carrying table may be rotated to move it toward the cutting zone, whereupon fluid pressure may be applied to firmly clamp the workpiece, as previously described.

From the foregoing description of an illustrative milling machine embodying this invention, it is apparent that there has been provided apparatus which is capable of rapidly and automatically effecting machining of successive workpieces in a substantially continuous operation. As more fully explained hereinbefore, the machine is arranged to receive workpieces at a loading station at the forward edge of a rotary table, automatically clamp them, and quickly move the workpieces into cutting position by rotating the table at rapid traverse rate. The workpieces are then fed past the cutter along a straight line by turning the table at feed rate and guiding the work holder by means of a cam fixed in the machine bed. After the cutting operation has been completed, the workpieces are led away from the cutting zone without returning them past the cutter, by continuing the rotation of the table in the same direction at rapid traverse rate. The invention has further provided improved clutching mechanism including selectively operable roller clutches for controlling rotation of the table, and improved hydraulic and electrical control systems for effecting control of the various functions of the machine, as well as other improvements in mechanisms and structural features tending to improve generally the efficiency and reliability of milling machines.

Although the foregoing description and the accompanying drawings have set forth the present invention for the most part in one exemplary mechanism, it is to be understood that the structure shown and described is intended only to be illustrative of an operative embodiment of the invention, and that it is contemplated that the various features may be incorporated in other structures without departing from the spirit and scope of the invention as defined in the subjoined claims.

The invention is hereby claimed as follows:

1. In a milling machine, the combination with a base and a cutter carrying spindle rotatably supported by said base, of a work carrying table rotatably mounted on said base and operative to move work into cooperating relationship with a cutter carried by said spindle, a plurality of work clamping fixtures carried by said table in manner to be movable relative thereto, guide means on said base disposed to engage said work clamping fixtures successively to guide them past said cutter along a predetermined path as said table is rotated, power transmission means operatively connected to turn said table at feed rate or at rapid traverse rate selectively, control means operative to effect movement of said table at feed rate while one of said fixtures is passing said cutter and at rapid traverse rate while one fixture is moving away from said cutter and another fixture is moving toward the position of engagement with said cutter, means to automatically clamp a workpiece in said fixture while it is moving from a loading position toward said cutter, and control means selectively operable to restrain said transmission means from operating said table at rapid traverse rate, whereby a fixture may be retained in loading position to complete a loading operation requiring more time than is necessary for the fixture passing the cutter to complete its feeding movement.

2. A milling machine comprising a base, a table rotatably mounted on said base, driving mechanism for said table including means for turning said table at rapid traverse rate or at feed rate selectively, fluid pressure operated work holders movably carried by said table for rotation therewith, means on said base disposed to engage said work holders in manner to guide them along a predetermined path through a cutting zone as said table is rotated, automatic control means operative to effect turning of said table alternately at feed rate and at rapid traverse rate and to effect clamping and unclamping of said work holders in manner to execute a substantially continuous machining operation, selectively operable means arranged to prevent rapid traverse movement of said table to provide time for loading a work holder, control means for adjusting the pressure exerted by said work holders in clamping a workpiece, and a chip receiving trough disposed circumferentially of said table and arranged to receive chips from the cutting zone.

3. In a milling machine having a base and a tool spindle rotatably carried by said base, the combination with a rotatable work carrying table journaled on said base, of a work supporting element slidably mounted on said table for radial movement relative thereto, a work holding fixture rotatably mounted on said slidable supporting element, and a guiding cam track disposed to be engaged by said work holding fixture as said table is rotated and operative to guide said fixture in cooperative relationship with said tool spindle along a predetermined path, whereby a workpiece held by said fixture may be caused to follow a desired course as it is moved in cutting engagement with a tool mounted in said spindle.

4. In a machine tool including a base and a supporting member movably mounted on said base, the combination with a source of driving power for moving said supporting member, a feed rate driving transmission train including an irreversibly driving device, and a rapid traverse rate driving transmission train, said trains being alternatively and selectively connectible to transmit power from said source to said supporting member, of means for operatively connecting said rapid traverse rate driving train to drive said member at rapid traverse rate, positively acting clutch means for connecting said irreversible feed rate driving train to drive said member at feed rate, and automatic control means responsive to movement of said supporting member to a predetermined position and operative thereupon to disconnect said rapid traverse rate driving train and immediately thereafter to engage said positively acting clutch to connect said irreversible feed rate driving train to said supporting member, whereby said supporting member may be moved at rapid traverse rate to a predetermined position and thereupon instantaneously and positively checked to movement at feed rate without danger of overrunning said position.

5. In a milling machine comprising a base, a tool carrying spindle rotatably supported by said base, and a work carrying table movably mounted on said base in cooperative relationship with said spindle; the combination with an electric motor operatively connected to drive said work carrying table, of a starting switch arranged to selectively energize said motor for operation in forward direction, a reversing switch arranged to energize said motor for operation in reverse direction, means to close said starting switch to initiate movement of said work carrying table, means to stop said work carrying table suddenly including a control element operatively connected to open said starting switch and to close said reverse switch thereby energizing said motor for operation in reverse direction, and a disconnecting switch responsive to reverse rotation of said motor to de-energize it upon reversal thereof, whereby said work carrying table may be stopped substantially instantaneously upon actuating said stopping control element.

6. In a machine tool, the combination with a base and a member movably mounted on said base, of driving mechanism for moving said member including a feed rate drive train and a rapid traverse rate drive train, means for operatively connecting said feed rate drive train to said movably mounted member including an overrunning clutch, means for operatively connecting said rapid traverse rate drive train to said movably mounted member including a selectively actuatable roller clutch, a second selectively actuatable roller clutch disposed to operatively connect said movably mounted member to said feed rate drive train in manner to prevent said member from overrunning said drive train, and control mechanism operative to disengage said rapid traverse roller clutch and immediately subsequently to engage said second roller clutch, whereby the rate of movement of said movably mounted member may be changed from rapid traverse rate to feed rate instantaneously and at an accurately predetermined point in the path of travel of said member.

7. In a milling machine having a frame and a milling cutter rotatably mounted in said frame, the combination with a work-supporting table movably mounted on said frame in cooperating relationship with said cutter and power means for driving said table, of means operatively connecting said power means to said table to drive it at feed rate including an overrunning clutch, means for driving said table at rapid traverse rate, and means for instantaneously changing the rate of movement of said table from rapid traverse to feed including a roller clutch engageable to prevent said table from overrunning said feed rate driving means, whereby upon said table being moved at rapid traverse rate to advance a workpiece into close proximity with said cutter the rate of movement will be changed to feed rate instantaneously and accurately with the workpiece in position to be fed into engagement with the cutter without appreciable delay.

8. In a milling machine, the combination with a base and a rotatable work supporting table journalled on said base, of transmission mechanism for driving said table at feed rate including an overrunning clutch operative to permit movement of said table at a faster rate, transmission mechanism for driving said table at rapid traverse rate including a ratchet mechanism, means for engaging said ratchet mechanism to couple said rapid traverse drive mechanism to said table to drive it, a second ratchet mechanism operative to couple said table to said feed rate driving mechanism, and control means operative to disengage said first ratchet mechanism and subsequently to engage said second ratchet mechanism, whereby movement of said table may be changed from rapid traverse rate to feed rate quickly and at an accurately predetermined position.

9. A transmission mechanism for a machine tool, comprising a driven member, an overrunning clutch operatively connected to drive said member, an irreversible drive mechanism operatively connected to actuate said overrunning clutch, and a selectively controlled ratchet clutch interposed between said irreversible drive mechanism and said driven member and operative in opposition to said overrunning clutch, the arrangement being such that when said ratchet clutch is engaged it cooperates with said overrunning clutch to afford a positive connection between said drive mechanism and said driven member, whereby overrunning of said driven member is prevented by reaction upon said irreversible drive mechanism.

10. In a machine tool, the combination with a base and a cutting tool carried by said base, of a work-supporting table rotatably mounted on said base, a work-holding fixture movably mounted on said table but constrained to rotate therewith, and guide means on said base disposed to guide said fixture along a predetermined noncircular path in cooperative relationship with said cutting tool when said table is rotated in manner to move said fixture through the cutting zone of said tool.

11. In a milling machine, the combination with a base and a cutter supporting spindle rotatably mounted on said base, of a rotatable work carrying table journalled on said base, a work holding fixture slidably mounted on said table for radial movement relative thereto, and a guiding cam track fixed to said base and disposed to engage said work holding fixture to guide said fixture along a predetermined path in cooperating relationship with said cutter spindle as said table is rotated.

12. In a milling machine, the combination with a base and a cutter supporting spindle rotatably mounted on said base, of a rotatable work carrying table journalled on said base, a work holding fixture slidably and rotatably mounted on said table for universal movement in the plane of rotation thereof, and a guiding cam track fixed to said base and disposed to engage said workholding fixture to guide said fixture along a predetermined path in cooperating relationship with said cutter spindle as said table is rotated.

13. In a milling machine, the combination with a base and a cutter supporting spindle rotatably mounted on said base, of a rotatable work carrying table journalled on said base, a work holding fixture rotatably mounted on said table in manner to revolve therewith and to turn relative thereto, and a guiding cam track fixed to said base and disposed to engage said work holding fixture to guide said fixture along a predetermined path in cooperating relationship with said cutter spindle as said table is rotated.

14. In a machine tool, the combination with a base and a cutting tool carried by said base, of a work supporting table rotatably mounted on said base, a work holding fixture rotatably and slidably mounted on said table for movement relative thereto in the plane of rotation thereof, and guide means disposed on said base in position to guide said fixture along a predetermined path in cooperative relationship with said cutting tool when said table is rotated.

15. In a machine tool, a supporting frame, a cutting tool associated with said frame, a supporting member arranged to be revolved bodily about an axis fixed relative to said frame, said member having limited freedom of movement relative to said axis, and guiding means carried by said frame and adapted to guide said member as it revolves bodily in manner to cause it to follow a predetermined non-concentric path through the cutting zone of said tool.

16. In a machine tool, a supporting frame, a cutting tool carried by said supporting frame, a work carrying table rotatably mounted on said frame, a work supporting fixture movably mounted on said table but constrained to revolve bodily therewith, and guide means on said frame disposed to engage said fixture as said table is rotated and guide it along a non-concentric path in cooperating relationship with said cutting tool.

17. In a milling machine, the combination with a base and a cutter carrying spindle rotatably supported by said base, of a work carrying table rotatably mounted on said base and operative to move work into cooperating relationship with a cutter carried by said spindle, a plurality of work clamping fixtures carried by said table in manner to be movable relative thereto while rotating bodily therewith, and guide means on said base disposed to engage said work clamping fixtures successively to guide them past said cutter along a predetermined non-concentric path as said table is rotated.

18. In a milling machine, the combination with a base and a cutter carrying spindle rotatably supported by said base, of a work carrying table rotatably mounted on said base and operative to move work into cooperating relationship with a cutter carried by said spindle, a plurality of work clamping fixtures carried by said table in manner to be movable relative thereto while rotating bodily therewith, guide means on said base disposed to engage said work clamping fixtures successively to guide them past said cutter along a predetermined non-concentric path as said table is rotated, power transmission means operatively connected to turn said table at feed rate or at rapid traverse rate selectively, and control means operative to effect movement of said table at feed rate while one of said fixtures is passing said cutter and at rapid traverse rate while one fixture is moving away from said cutter and another fixture is moving toward the position of engagement with said cutter.

19. In a milling machine, the combination with a base and a cutter carrying spindle rotatably supported by said base, of a work carrying table rotatably mounted on said base and operative to move work into cooperating relationship with a cutter carried by said spindle, a plurality of work clamping fixtures carried by said table in manner to be movable relative thereto while rotating bodily therewith, guide means on said base disposed to engage said work clamping fixtures successively to guide them past said cutter along a predetermined non-concentric path as said table is rotated, power transmission means operatively connected to turn said table at feed rate or at rapid traverse rate selectively, control means operative to effect movement of said table at feed rate while one of said fixtures is passing said cutter and at rapid traverse rate while one fixture is moving away from said cutter and another fixture is moving toward the position of engagement with said cutter, and means automatically operative to clamp a workpiece in said fixture while it is moving from a loading position toward said cutter.

20. A milling machine comprising a base, a table rotatably mounted on said base, driving mechanism for said table including means for turning said table at rapid traverse rate or at feed rate selectively, fluid pressure operated work holders movably carried by said table for rotation therewith, means on said base disposed to engage said work holders in manner to guide them along a predetermined path through a cutting zone as said table is rotated, and automatic control means operative to effect turning of said table alternately at feed rate and at rapid traverse rate and to effect clamping and unclamping of said work holders in manner to execute a substantially continuous machining operation.

21. A milling machine comprising a base, a table rotatably mounted on said base, driving mechanism for said table including means for turning said plate at rapid traverse rate or at feed rate selectively, fluid pressure operated work holders movably carried by said table for rotation therewith, means on said base disposed to engage said work holders in manner to guide them along a predetermined path through a cutting zone as said table is rotated, automatic control means operative to effect turning of said table alternately at feed rate and at rapid traverse rate and to effect clamping and unclamping of said work holders in manner to execute a substantially continuous machining operation, and selectively operable means arranged to prevent rapid traverse movement of said table to provide additional time for loading a work holder.

22. In a machine tool, the combination with a base and a supporting member movably mounted on said base, of driving mechanism arranged to move said supporting member at feed rate or at rapid traverse rate alternatively, automatic control apparatus operative to effect movement of said supporting member at feed rate through a cutting and loading stroke and alternately at a rapid traverse rate through a work positioning stroke to execute an automatic cycle of operation, and selectively operable control means including a latching device operative to forestall movement of said automatic control apparatus and effective upon actuation to delay change from feed rate to rapid traverse rate of movement otherwise effected by functioning of said automatic control apparatus, whereby the period of movement at feed rate may be prolonged to permit completion of a loading operation after which the selective control may be released to permit the automatic control to effect delayed work positioning movement of said supporting member at rapid traverse rate.

23. In a milling machine having a frame and a milling cutter rotatably carried by said frame, the combination with a work-supporting table movably mounted on said frame in cooperating relationship with said milling cutter, and power driven means for moving said table, of transmission mechanism operatively connecting said power driven means to said table to drive it at feed rate including an overrunning clutch arranged to permit operation of said table at rapid traverse rate, power driven mechanism selectively connectible for driving said table at rapid traverse rate with said feed rate clutch overrunning, and means for changing instantaneously the rate of movement of said table from rapid traverse rate to feed rate including a positive clutch selectively engageable to prevent said table from overrunning said feed rate driving mechanism, whereby said table may be moved at rapid traverse rate to advance a workpiece into close proximity with said milling cutter and the rate of movement then changed instantaneously to feed rate with the workpiece accurately positioned to be fed into engagement with said milling cutter with minimum delay.

OTTO W. CARPENTER, JR.,
Special Administrator of the Estate of Edward J. Kearney, Deceased.
JOSEPH B. ARMITAGE.
WALTER M. POHL.